US010009916B2

(12) United States Patent
Groh et al.

(10) Patent No.: US 10,009,916 B2
(45) Date of Patent: Jun. 26, 2018

(54) COMMUNICATION DEVICE AND METHOD FOR PROCESSING RECEIVED SIGNALS

(71) Applicant: Intel Corporation, Santa Clara, CA (US)

(72) Inventors: Ingmar Groh, Dresden (DE); Kenan Kocagoez, Nuremberg (DE); Andreas Bury, Dresden (DE)

(73) Assignee: INTEL CORPORATION, Santa Clara, CA (US)

( * ) Notice: Subject to any disclaimer, the term of this patent is extended or adjusted under 35 U.S.C. 154(b) by 278 days.

(21) Appl. No.: 14/580,245

(22) Filed: Dec. 23, 2014

(65) Prior Publication Data

US 2016/0183287 A1 Jun. 23, 2016

(51) Int. Cl.
*H04W 72/12* (2009.01)
*H04L 25/02* (2006.01)

(52) U.S. Cl.
CPC ....... *H04W 72/1263* (2013.01); *H04L 25/022* (2013.01); *H04L 25/0234* (2013.01); *H04L 25/0256* (2013.01); *H04W 72/1289* (2013.01)

(58) Field of Classification Search
CPC .............. H04L 25/022; H04L 25/0234; H04L 25/0256; H04W 72/1289
See application file for complete search history.

(56) References Cited

U.S. PATENT DOCUMENTS

| 5,388,063 A | 2/1995 | Takatori et al. |
| 5,487,023 A | 1/1996 | Seckora |
| 6,243,729 B1 | 6/2001 | Staszewski |
| 2004/0146117 A1* | 7/2004 | Subramaniam ..... H04L 25/0242 375/260 |
| 2009/0122853 A1* | 5/2009 | Lopez de Victoria ............. H04L 25/0248 375/232 |

(Continued)

FOREIGN PATENT DOCUMENTS

| WO | 2009045135 A1 | 4/2009 |
| WO | 2009068971 A1 | 6/2009 |
| WO | 2014023361 A1 | 2/2014 |

OTHER PUBLICATIONS

European Search Report received for EP Application No. 15195502.8 dated May 9, 2016, 9 pages.

(Continued)

*Primary Examiner* — David Oveissi
(74) *Attorney, Agent, or Firm* — Viering Jentschura & Partner MBB

(57) ABSTRACT

A communication device is described comprising a receiver configured to receive a plurality of first reference signal values in a first subframe of a radio frame structure and to receive a plurality of second reference signal values in a second subframe of the radio frame structure, wherein the first subframe and the second subframe are separated by one or more subframes of the radio frame structure, a first filter configured to filter the plurality of first reference signal values received in the first subframe to generate a first channel estimate, a second filter configured to filter the plurality of second reference signal values received in the second subframe based on the first channel estimate to generate a second channel estimate and a processor configured to process received signals based on the second channel estimate.

19 Claims, 26 Drawing Sheets

(56) References Cited

U.S. PATENT DOCUMENTS

2011/0044250 A1     2/2011   Han et al.
2012/0088458 A1*   4/2012   Nogami .............. H04B 7/0632
                                                                                        455/67.11

OTHER PUBLICATIONS

Oppenheim et al., "Discrete-time signal processing", Prentice Hall, New Jersey, 1989, 897 pages.
Baltersee et al., "Performance Analysis of Phasor Estimation Algorithms for a FDD-UMTS RAKE Receiver", IEEE 6th Int. Symp. on Spread-Spectrum Tech. & Appli., NJIT, New Jersey, Sep. 2000, 5 pages.
Fock et al. "Channel Tracking for RAKE Receivers in Closely Spaced Multipath Environments", IEEE Journal on Selected Areas in Communications, Dec. 2001, pp. 2420-2431, (vol. 19, No. 12).
Taiwanese Office Action based on Application No. 104138147(8 Pages and 6 pages of English translation) dated Dec. 13, 2016.

* cited by examiner

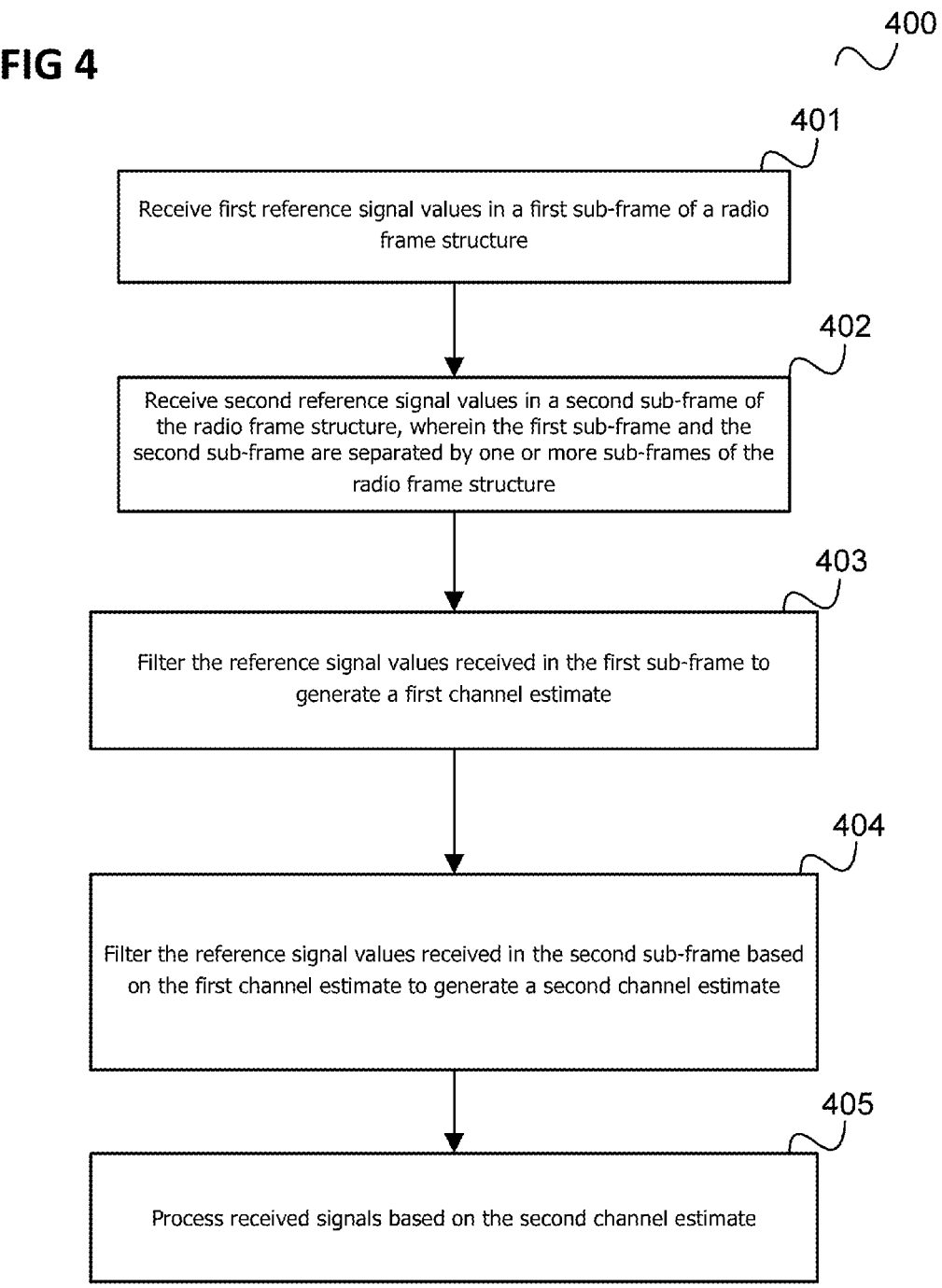

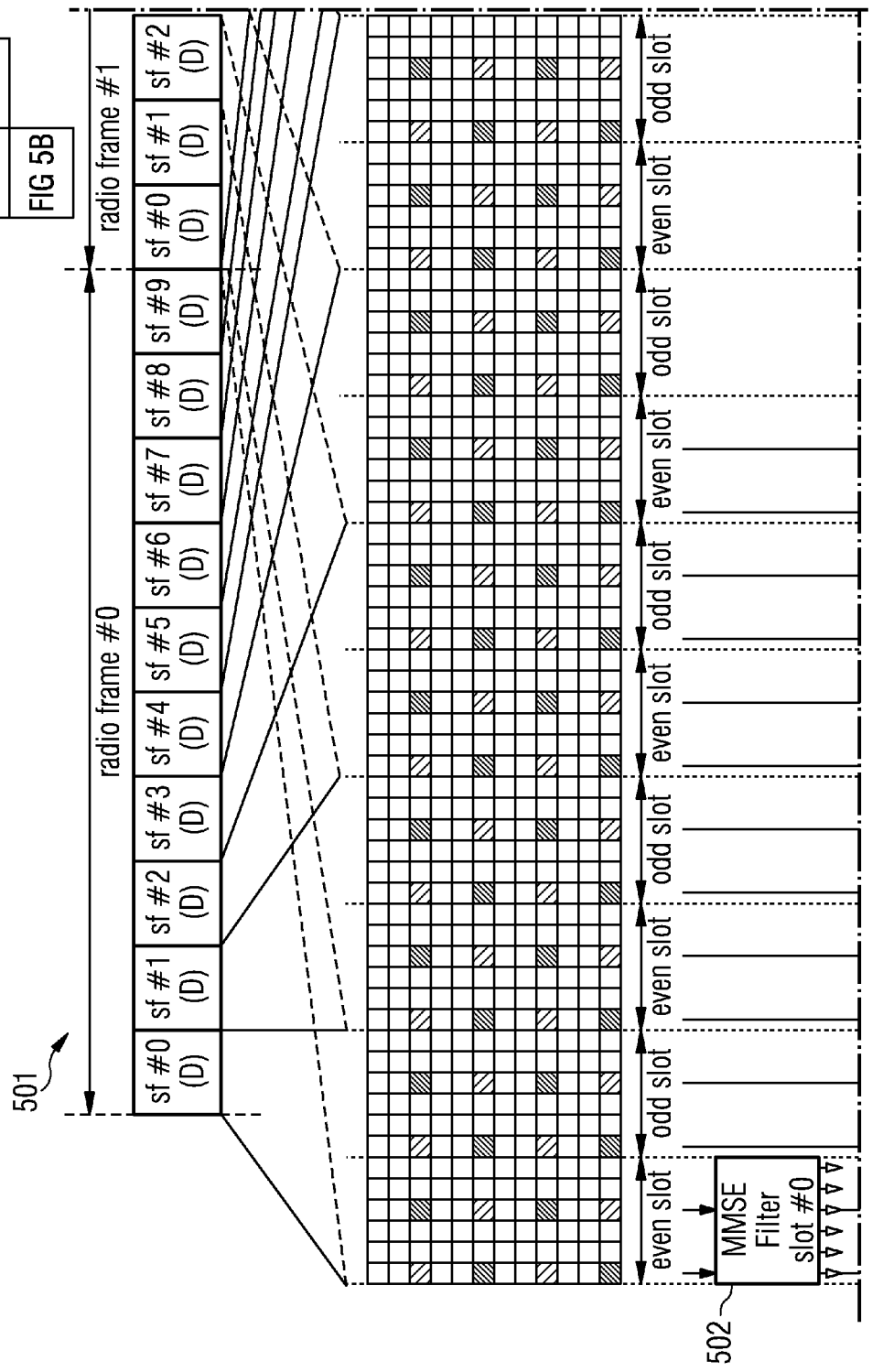

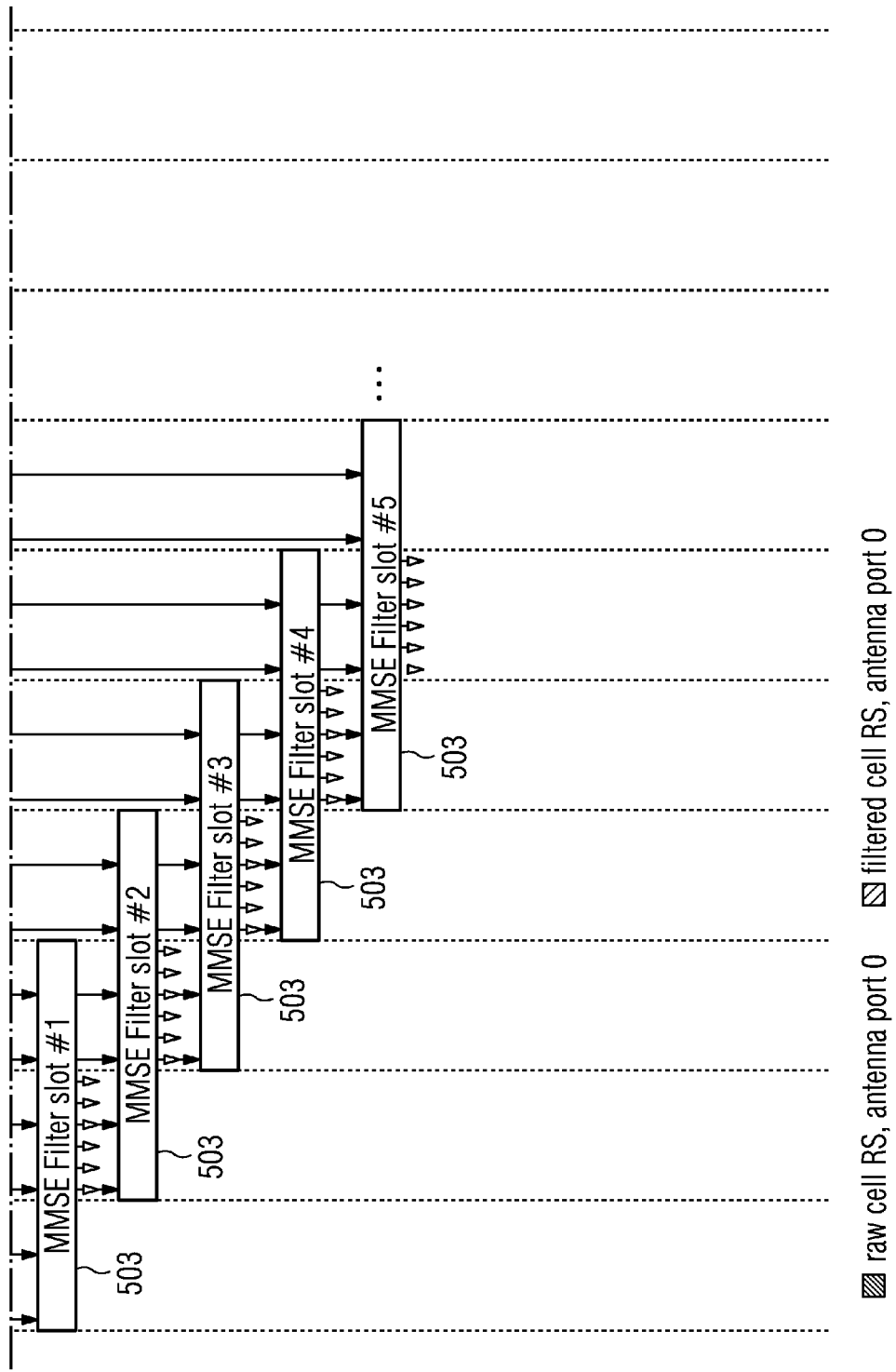

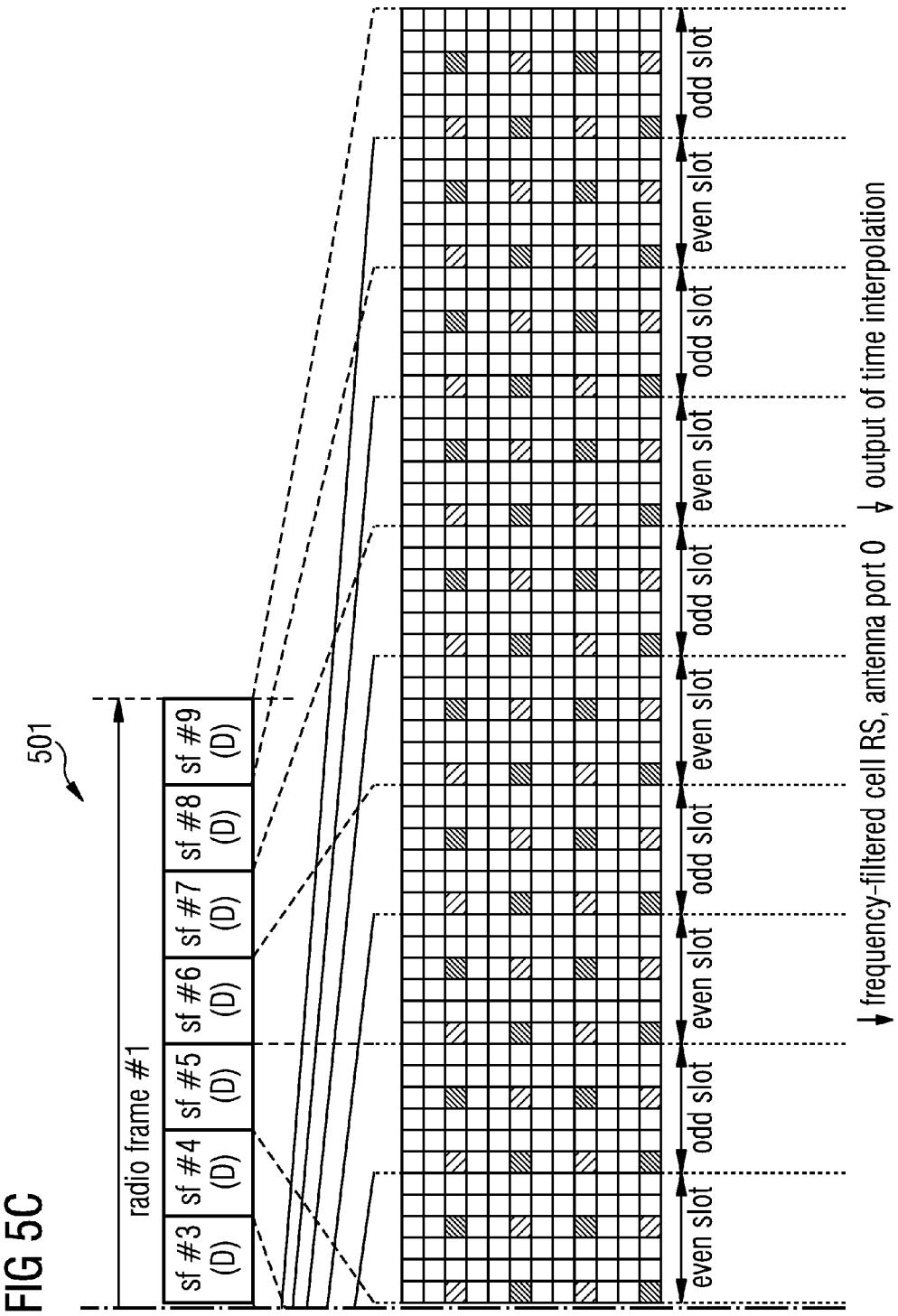

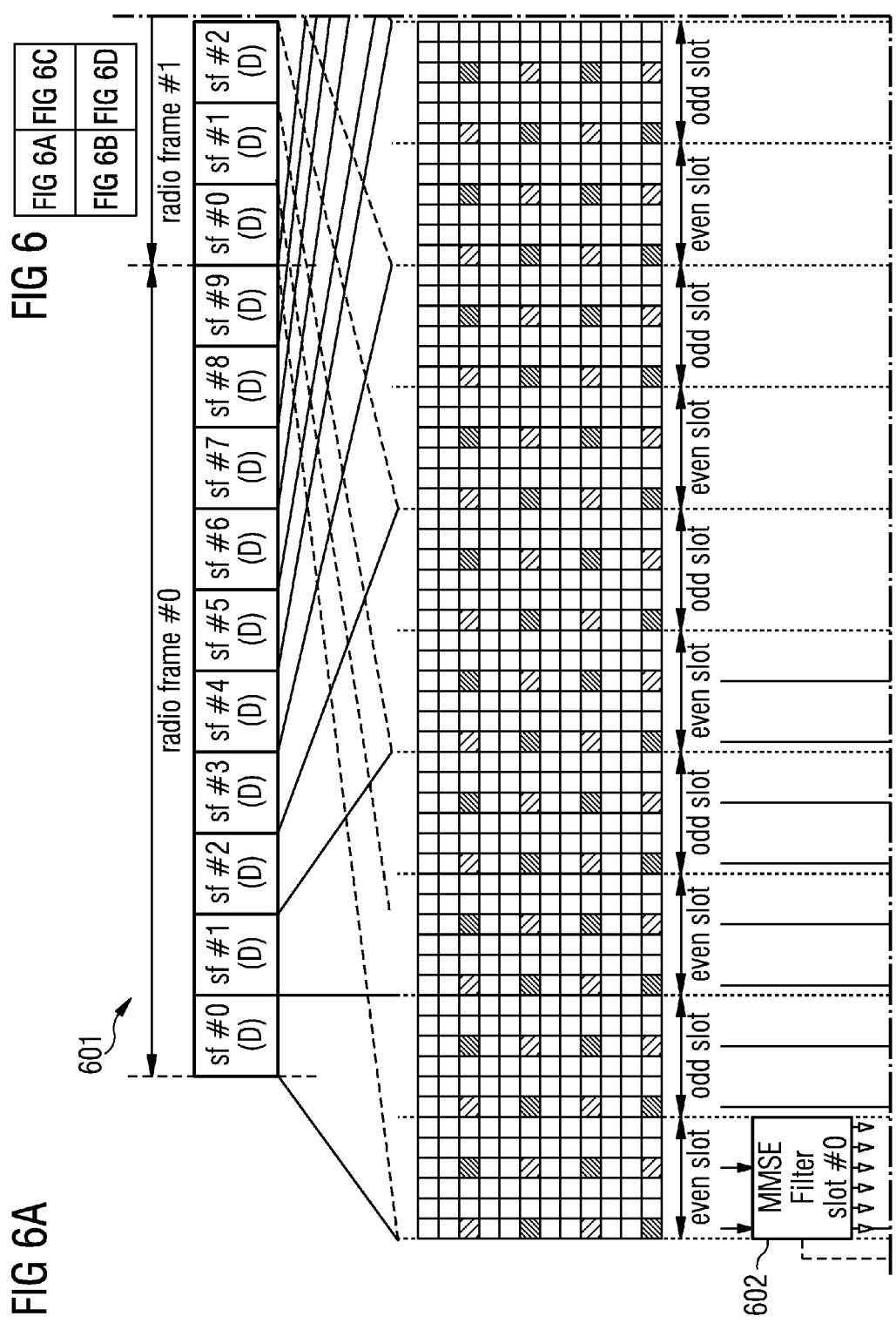

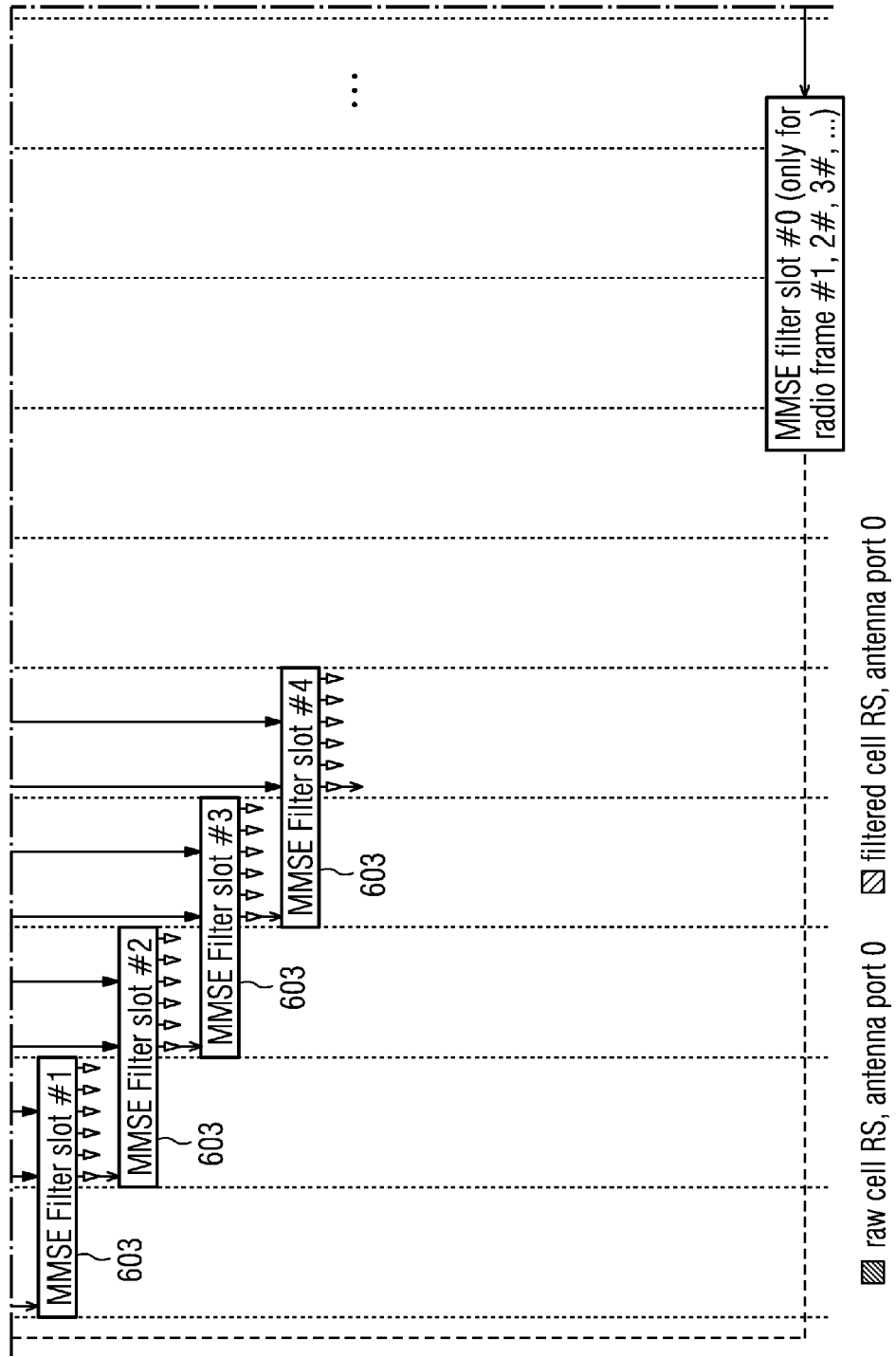

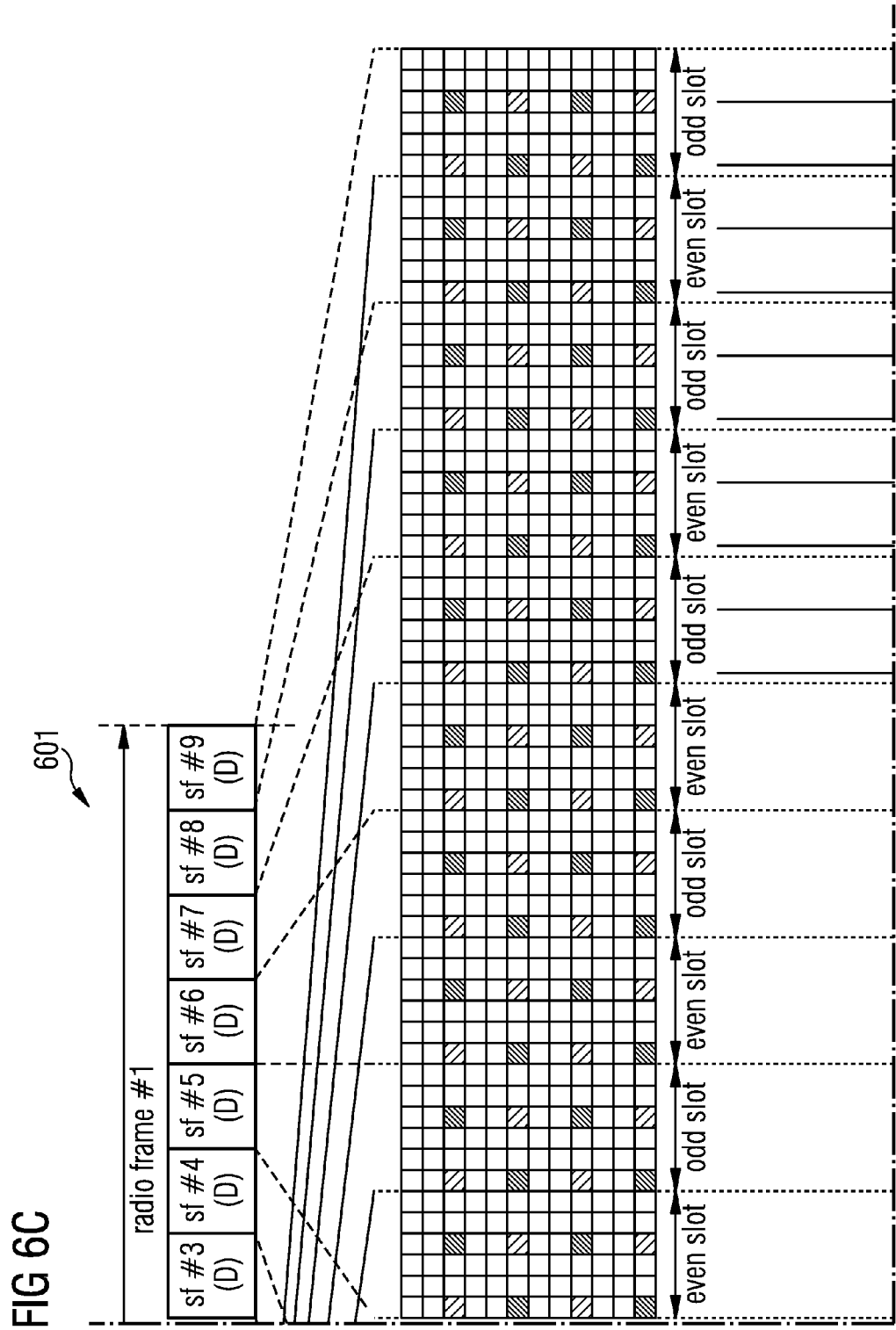

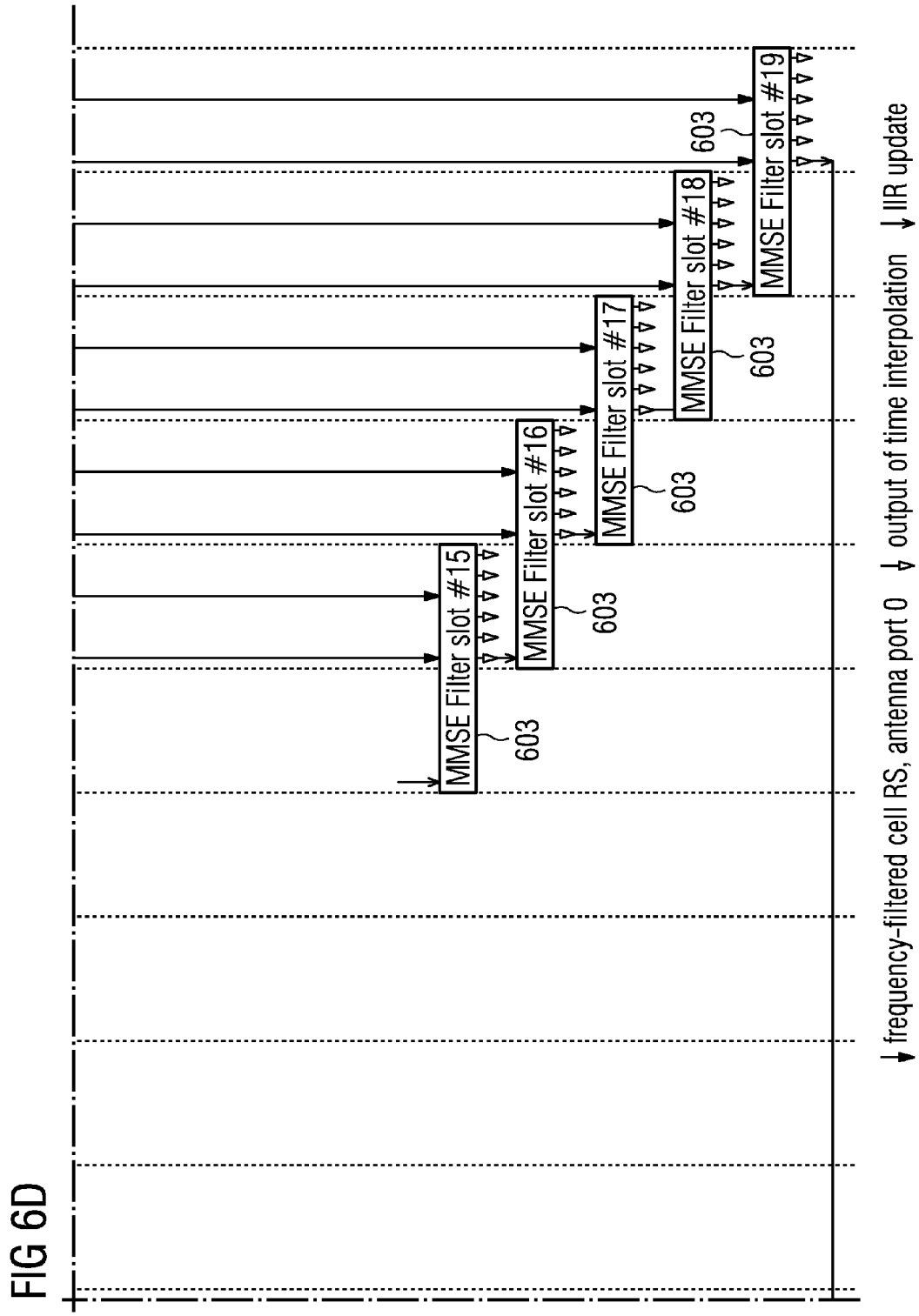

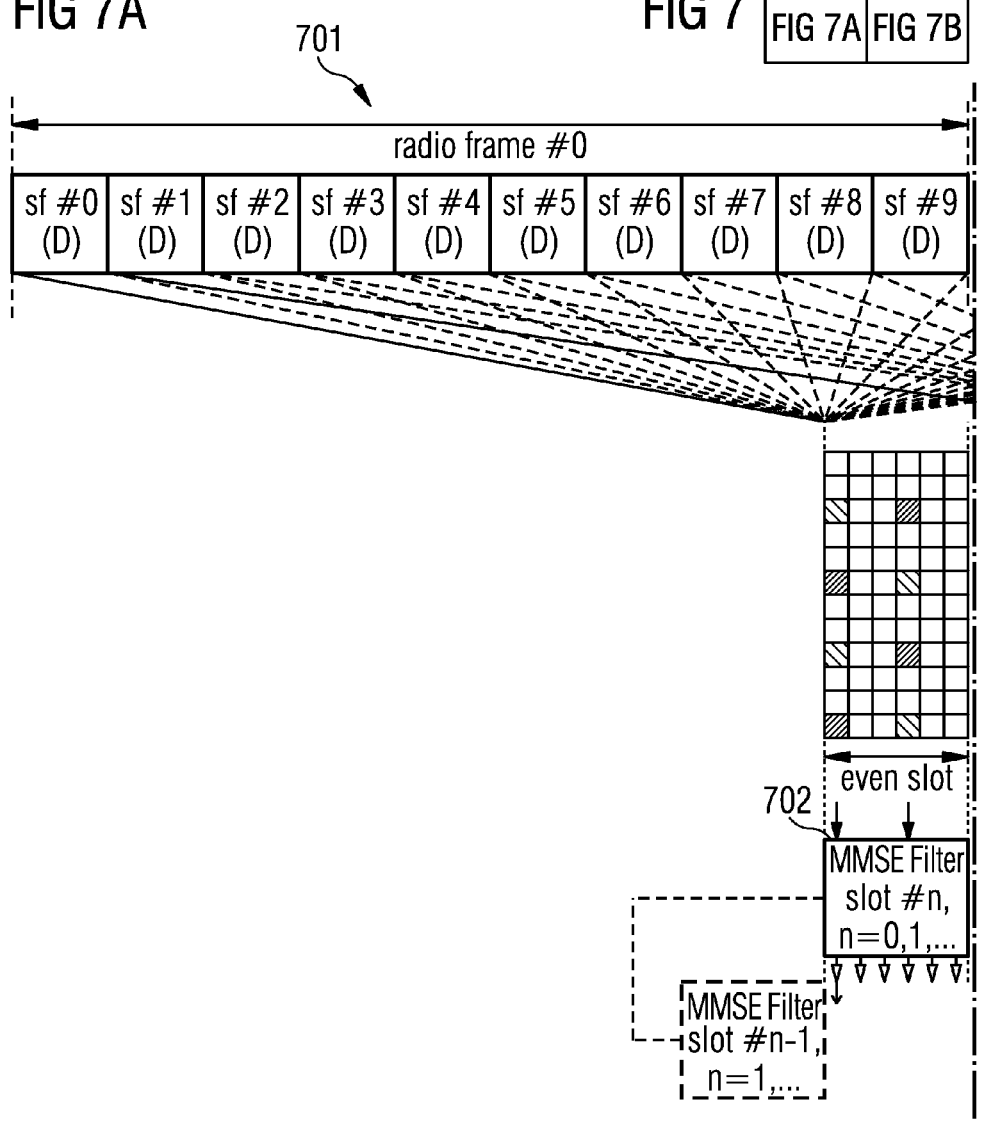

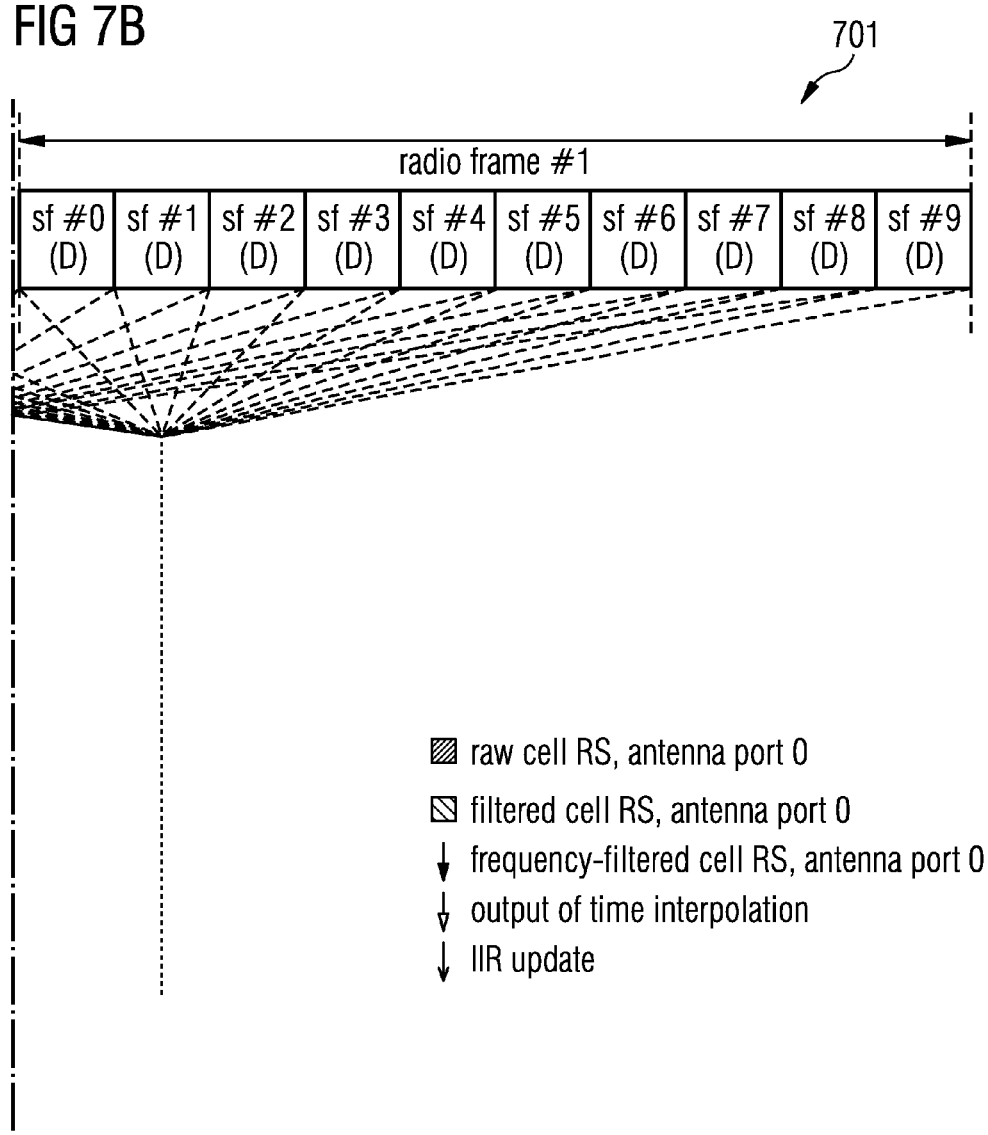

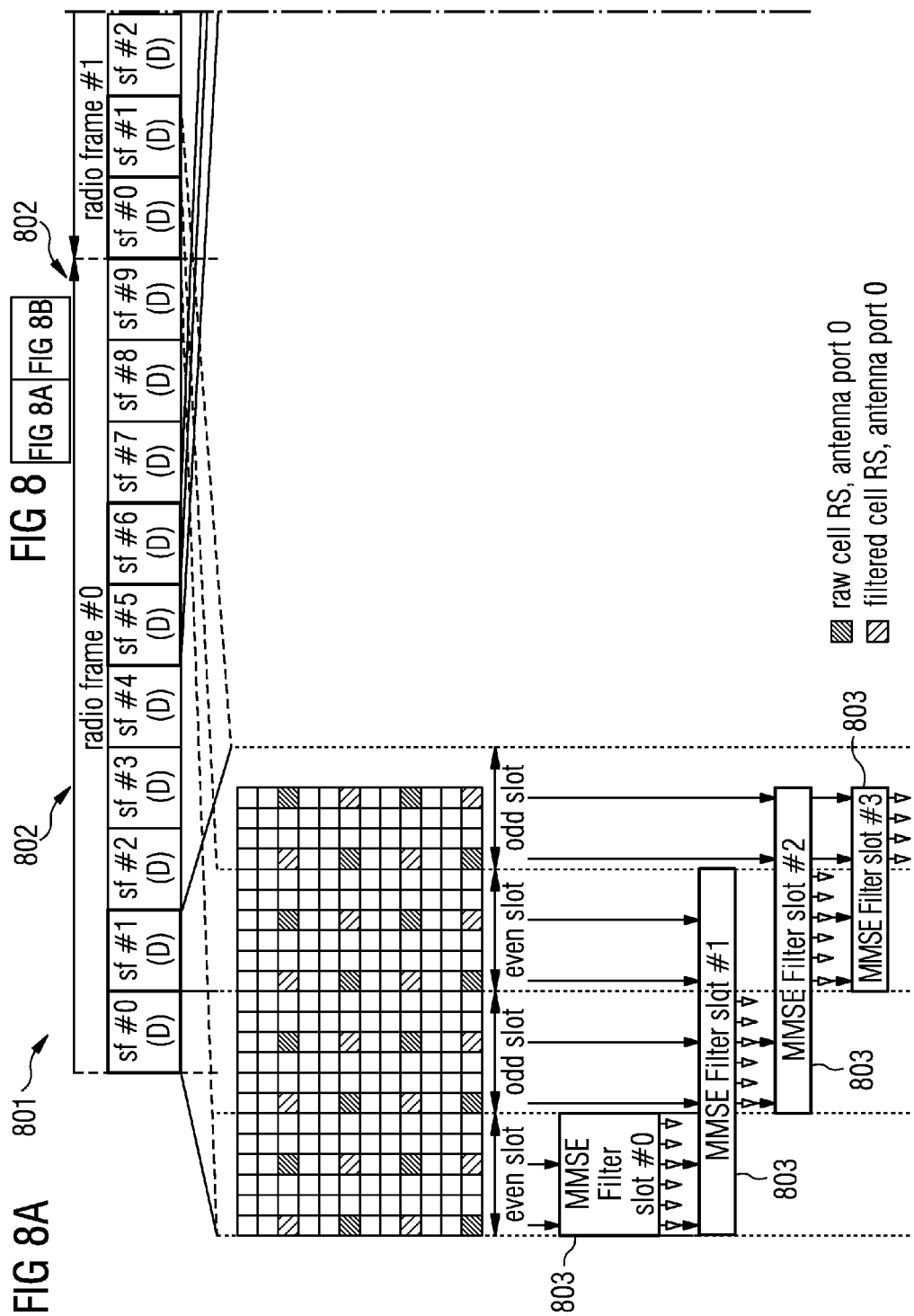

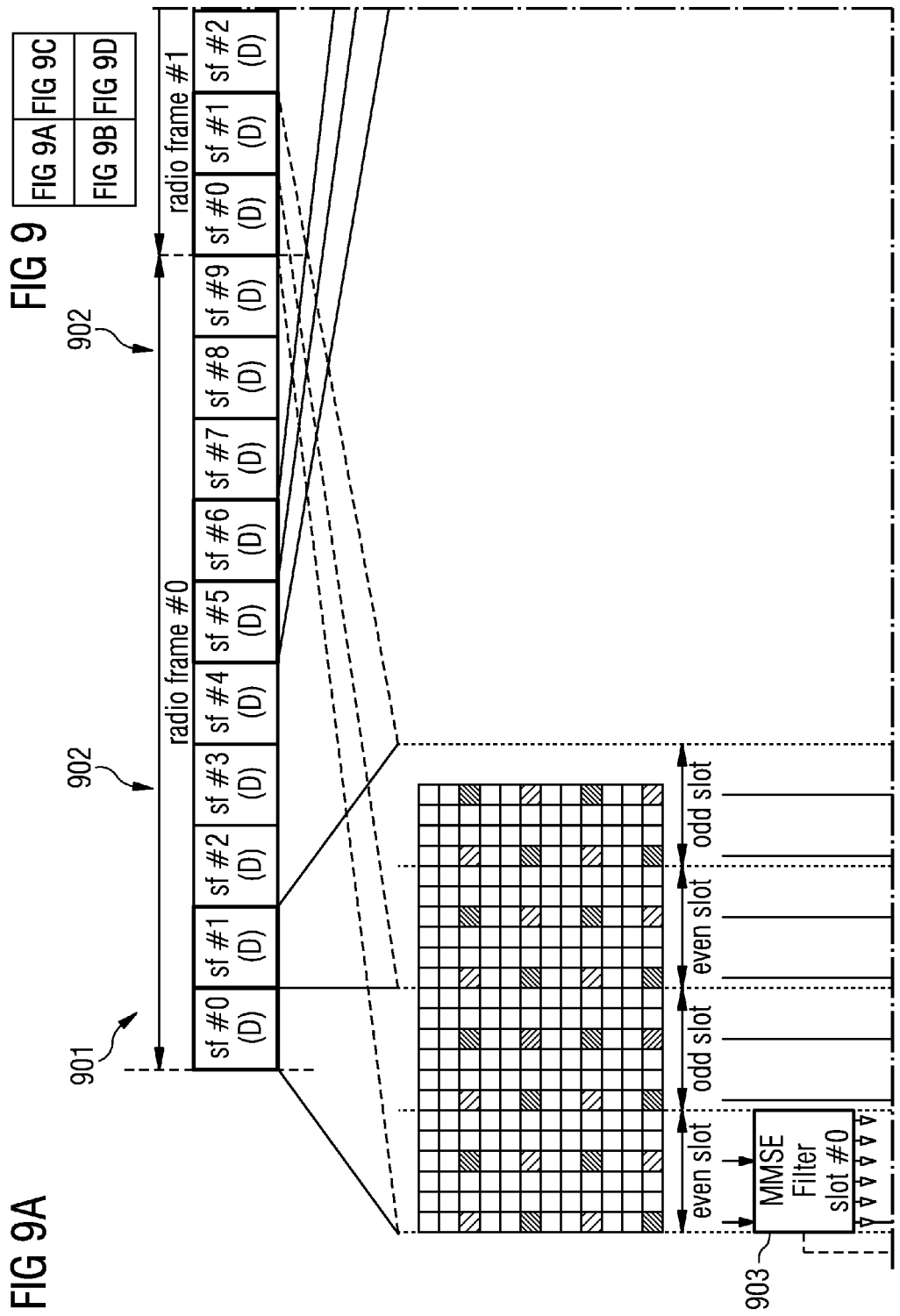

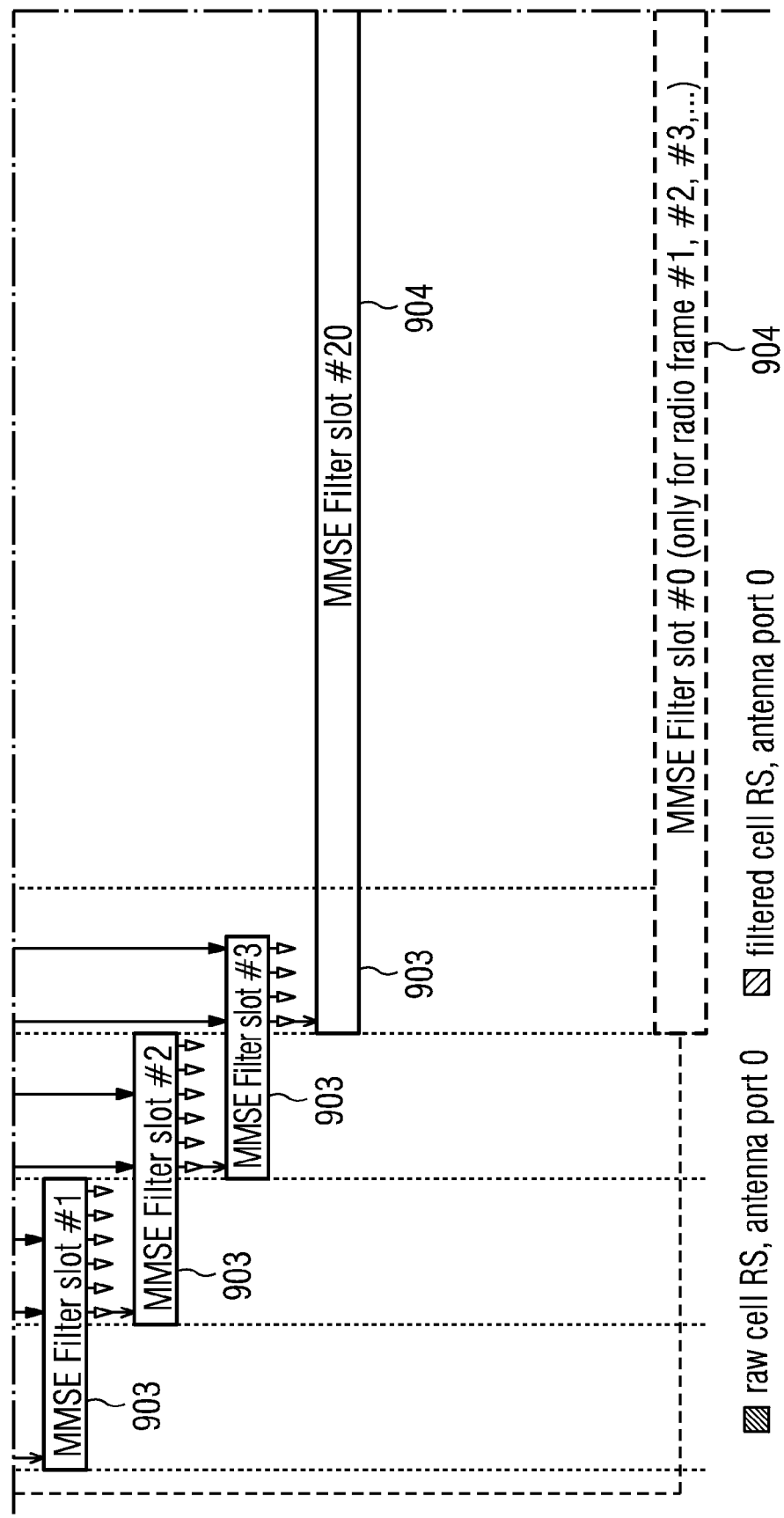

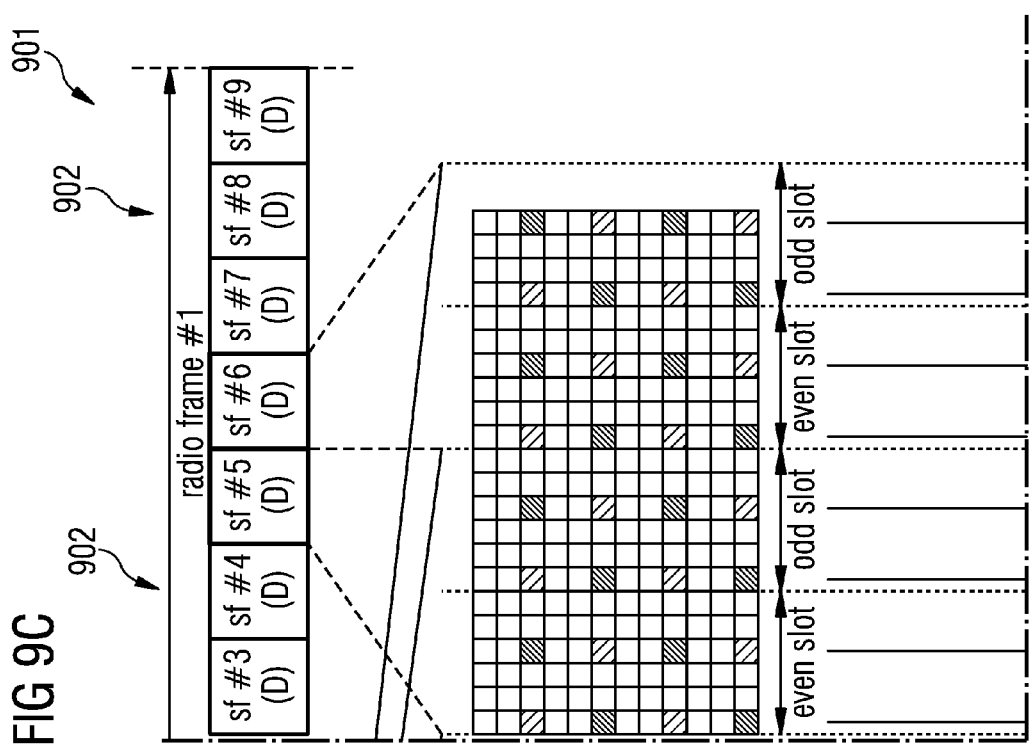

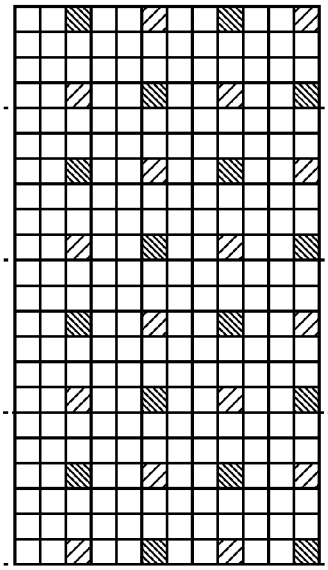

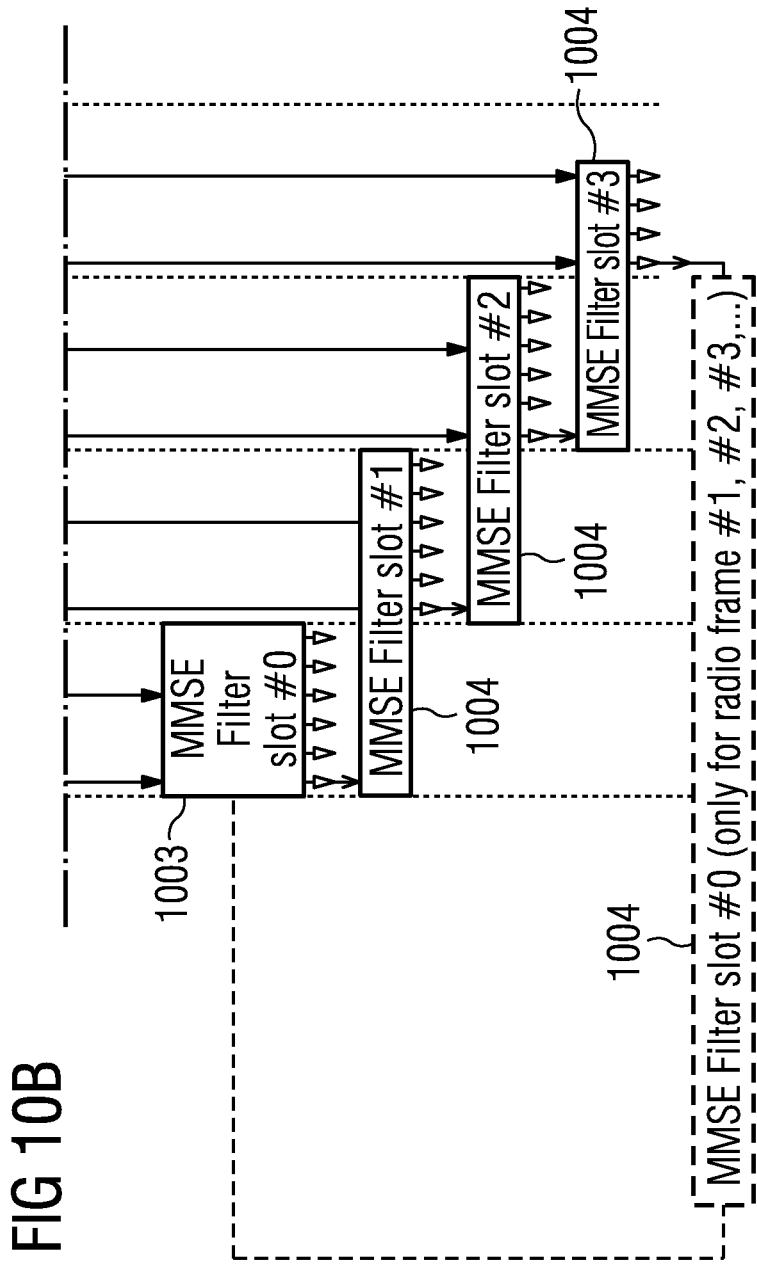

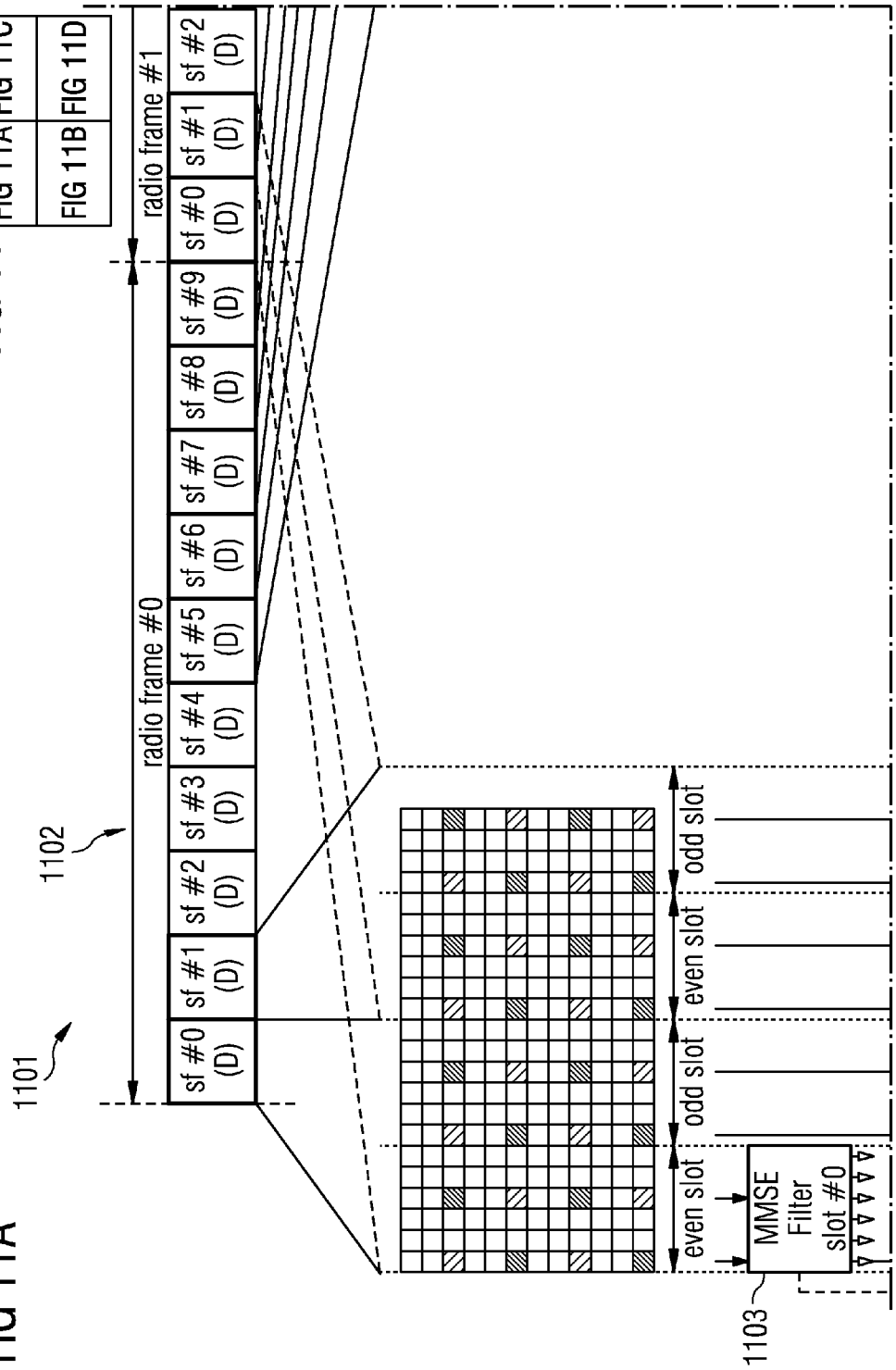

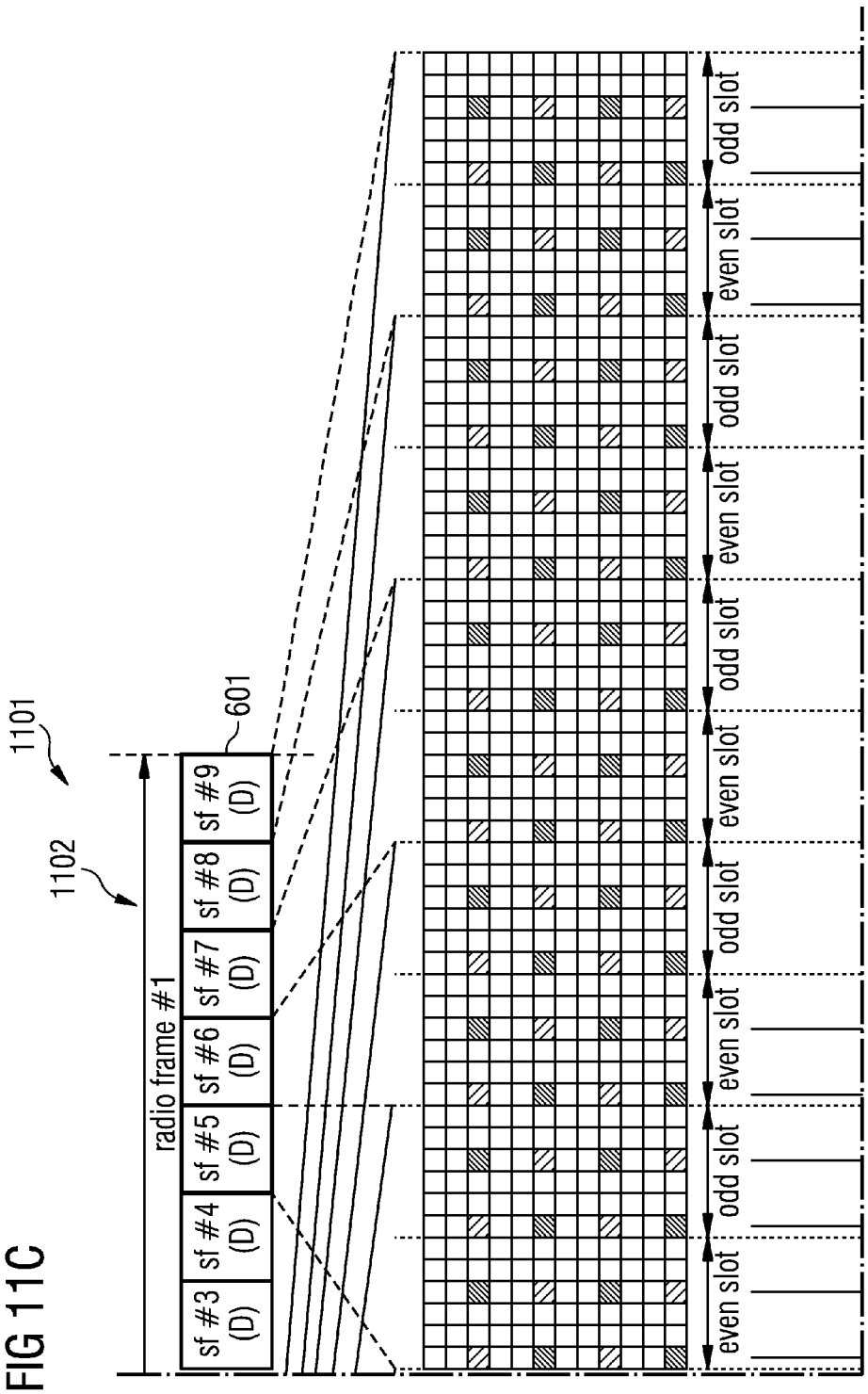

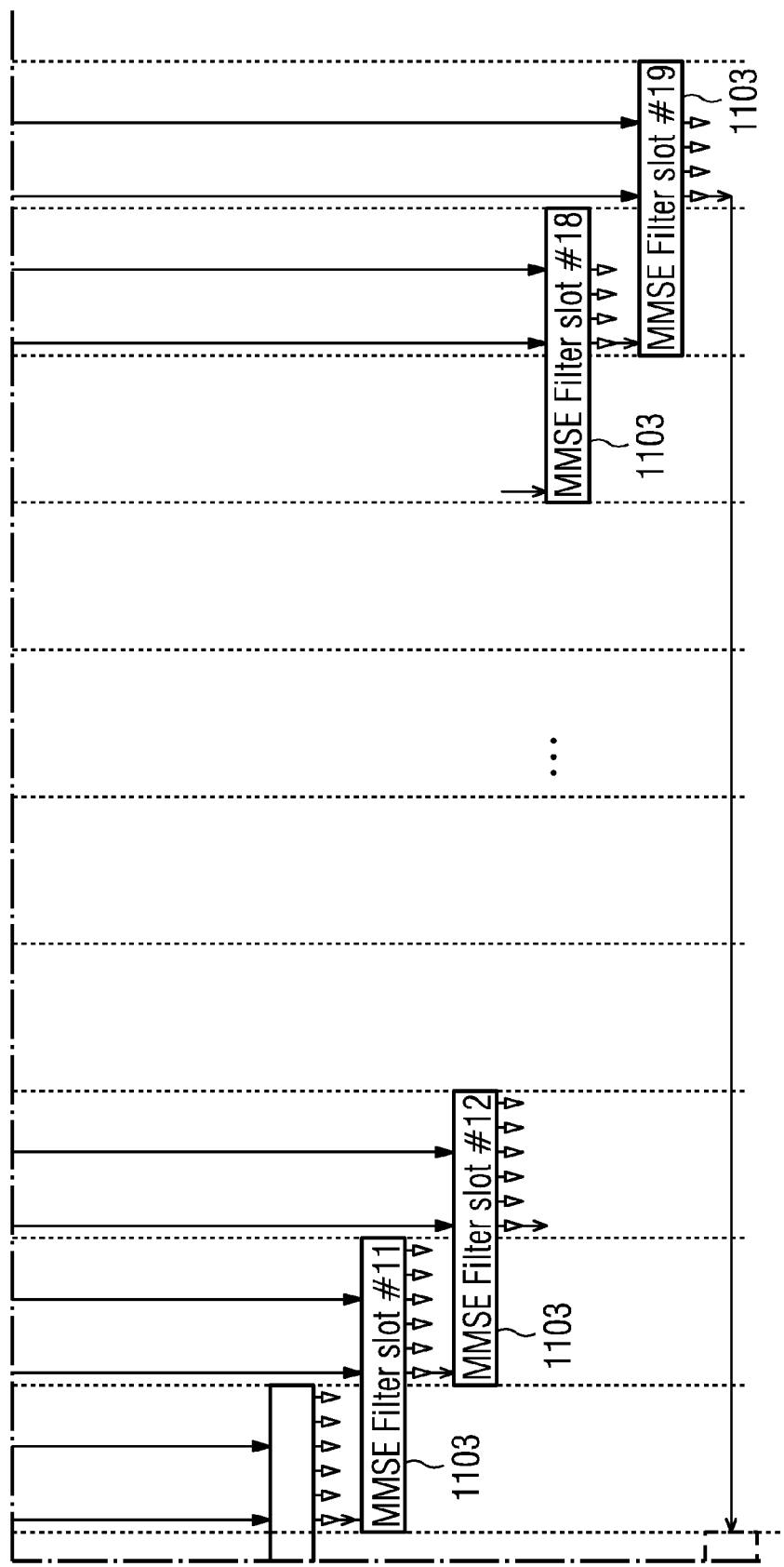

COMMUNICATION DEVICE AND METHOD FOR PROCESSING RECEIVED SIGNALS

TECHNICAL FIELD

Embodiments described herein generally relate to communication devices and methods for processing received signals.

BACKGROUND

Mobile communication systems face a continuously increasing demand for improved link quality and higher throughput.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 4 shows a flow diagram illustrating a method for processing received signals.

FIGS. 5 and 5A-5C illustrate FIR time filtering of reference symbols for FDD communication.

FIGS. 6 and 6A-6D illustrate IIR time filtering for FDD communication including an iterative minimum mean square error filter computation with an IIR update taking place every time slot.

FIGS. 7 and 7A-7B illustrate IIR time filtering for FDD communication including an iterative minimum mean square error filter computation with an IIR update taking place every time slot.

FIGS. 8 and 8A-8B illustrate FIR time filtering in a TDD communication, in this example for ul/dl configuration 0 and special sf configuration 3 according to 3GPP.

FIGS. 9 and 9A-9D illustrate IIR time filtering in a TDD communication, in this example for ul/dl configuration 0 and special sf configuration 3, including iterative minimum mean square error filter computation.

FIGS. 10 and 10A-10C illustrate IIR time filtering in a TDD communication, in this example for ul/dl configuration 0 and special sf configuration 3, with steady state filters.

FIGS. 11 and 11A-11D illustrate IIR time filtering for a TDD communication including iterative minimum mean square error filter computation, in this example for ul/dl configuration 3, special sf configuration 3.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
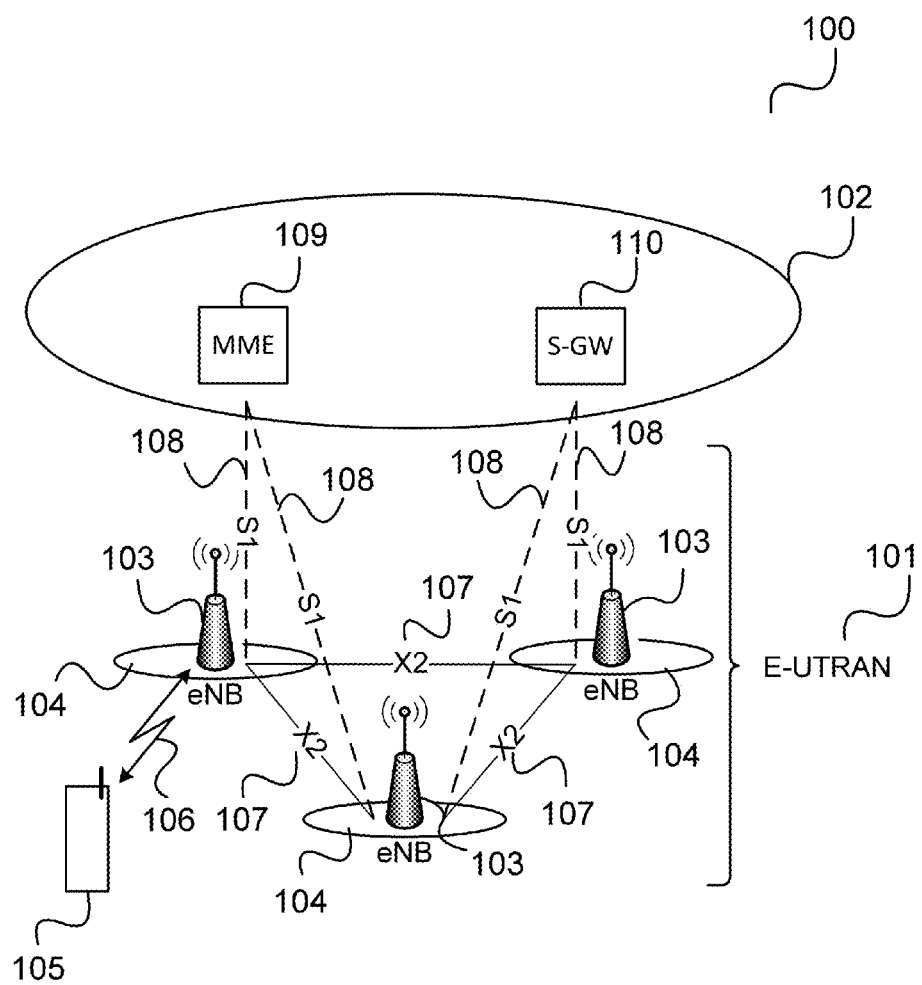
FIG. 1 shows a communication system.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. a UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

Data transmission between the mobile terminal 105 and the corresponding base station 103 (i.e. the base station operating the radio cell in which the mobile terminal 105 is located) is carried out in accordance with a (radio) frame structure. An example of a frame structure is shown in FIG. 2.

Figure 2:
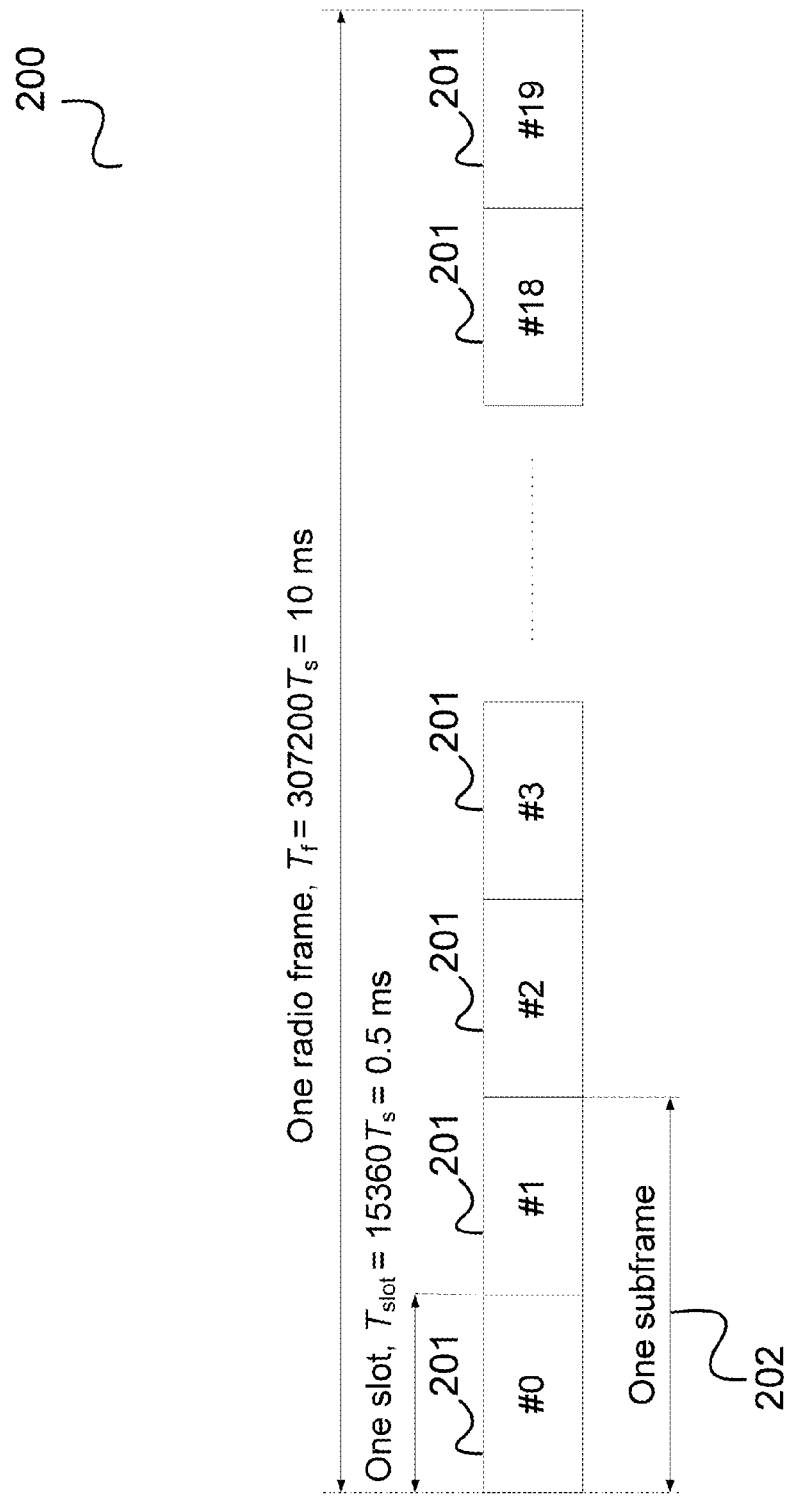
FIG. 2 shows an example of a frame.

FIG. 2 shows a frame 200 of an exemplary frame structure.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval ten subframes 202 are available for downlink transmissions or uplink transmissions. It should however be noted that according to other radio access technologies, a frame may have a different number of subframes than ten and a subframe may include more than two slots.

Uplink and downlink transmissions are separated in the frequency domain. Depending on the slot format a subframe 202 may include 12 or 14 OFDM (orthogonal frequency division multiple access) symbols in DL (downlink) and 12 or 14 SC-FDMA symbols in UL (uplink), respectively.

In a mobile communication system such as illustrated in FIG. 2 and also for example in satellite navigation systems, a sender (e.g. a base station) embeds pilot signals (also referred to as reference signals (RS), e.g. CRS (Cell Specific RS), PRS (Positioning RS), DM-RS (Demodulation RS), MBSFN-RS (Multicast-Broadcast Single Frequency Network RS), CSI-RS (Channel State Information RS)) in transmitted data to allow a receiver to determine channel characteristics. The receiver typically filters the pilot signals in frequency and time direction to minimize impairments on the transmission from Doppler and delay spread.

One approach for filtering in time direction is the FIR (finite impulse response) filter, which discards any channel estimate from the past. At low Doppler frequencies, it can be reduced to an averaging of the reference symbols in time direction, where an increased number of filter taps yields an improved noise averaging. However, this method of SNR (signal to noise ratio) improvement may be confined in practice by memory constraints, as typically only a small number of reference symbols can be stored.

To obtain an improved noise averaging with a low number of reference symbols to be stored, an IIR (infinite impulse response) filter may be used. It may be applied assuming reference symbol patterns (i.e. reference signal transmission patterns) without gaps, e.g. in an FDD system where each subframe in a radio frame has the same reference symbol sub-pattern such that for reference symbol patterns with gaps, e.g. in TDD systems, where after each gap, the IIR filtering is initialized from the beginning with an FIR filter, the noise averaging of the IIR filter is typically confined to the number of consecutive subframes, where reference symbols are available, which typically yields a poor performance at low SNRs.

Apart from the time filtering, a noise averaging can be also achieved by a suitable shift of the FFT (fast Fourier transform) window, where the phasors of the FFT de-rotate the channel phasors to achieve a coherent noise averaging. However, the noise averaging is typically confined to the FFT length and the bandwidth, whereas for the time direction filtering, this limitation does not exist.

Especially in low SNR scenarios, to maintain user experience, it is typically desirable to apply longer filtering periods in a receiver. However, pilot signal transmission employed in TDD, MBMS or navigation systems (such as GPS) is typically non-contiguous in time direction such that filtering in time domain is confined by non-contiguous pilot signal transmission. With time filtering limitations and low SNR, transmission channel recovery in the receiver suffers, which may lead to failing to satisfy performance requirements and to poor user experience.

In the following, examples are given which may allow maintaining high performance even in scenarios of non-contiguous pilot signal transmission.

Figure 3:
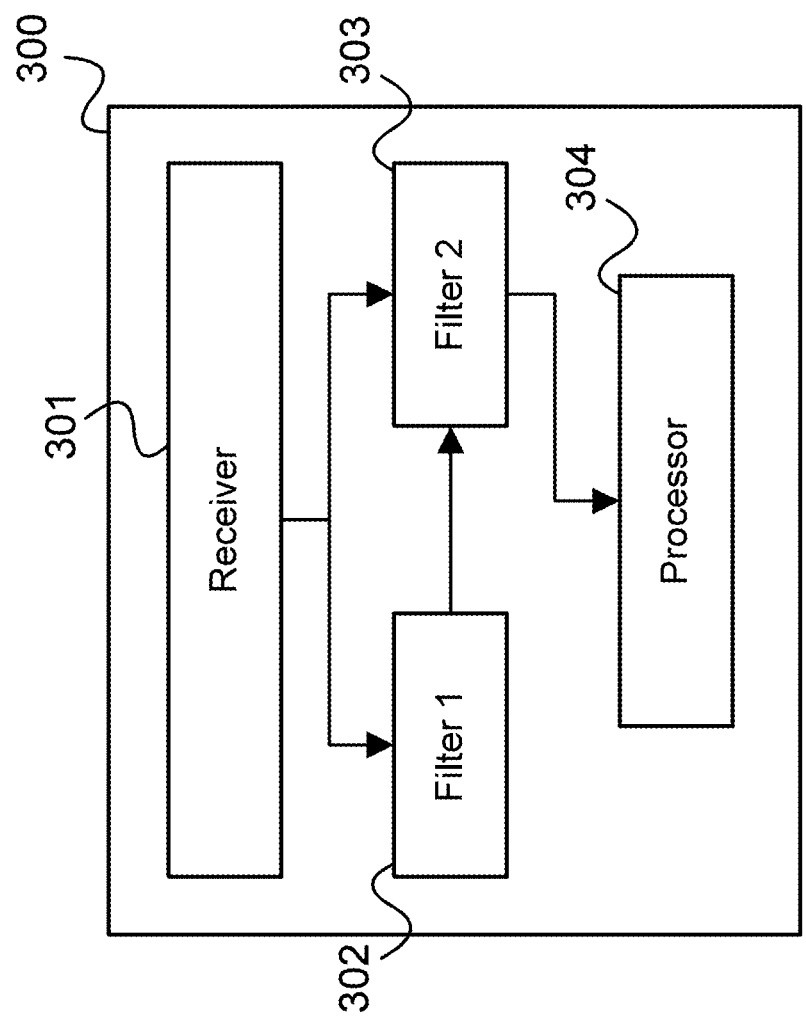
FIG. 3 shows a communication device.

FIG. 3 shows a communication device 300.

The communication device 300 includes a receiver 301 configured to receive first reference signals in a first subframe of a radio frame structure and to receive second reference signals in a second subframe of the radio frame structure, wherein the first subframe and the second subframe are separated by one or more subframes of the radio frame structure.

The communication device 300 further includes a first filter 302 configured to filter the reference signals received in the first subframe to generate a first channel estimate and a second filter 303 configured to filter the reference signals received in the second subframe based on the first channel estimate to generate a second channel estimate.

The communication device 300 further includes a processor 304 configured to process received signals based on the second channel estimate.

In other words, for example, a communication device (e.g. a mobile terminal) uses a channel estimate resulting from a first filter operation for a second filter operation even if the reference signals (e.g. pilot signals) processed by the second filter operation are separated from the reference signals processed by the first filter operation by a gap (of one or more subframes), i.e. the first subframe and the second subframe are non-adjacent subframes of the radio frame structure. The second channel estimate may for example be used to process signal values (e.g. including control data or user data) transmitted in addition to the reference signals (e.g. using other resource elements or other OFDM symbols).

For example, the communication device uses an IIR filtering scheme which may be applied for reference symbol transmission patterns having gaps.

To reduce the amount of filter coefficients that the communication device needs to store, filters may be combined, e.g. as follows: First, the communication device determines a period after which a reference symbol pattern is repeated in time direction (which is for example one radio frame). Second, a time interval for computing an IIR update (e.g. a channel estimate) within this period is determined (i.e. a time interval in which the communication device receives the reference symbols processed in by one filter). The communication device for example chooses the time interval as the smallest period in time after which the same reference symbol pattern appears most frequently, i.e., one slot for CRS and one subframe for MBSFN-RS. For some cases, such as special subframes in TDD, the number of incoming RS can be smaller (i.e. the period can be smaller), but such a transition typically appears very rarely. Third, for each transition from one time interval to the next time interval within one period an iterative minimum mean square error filter for the time direction is determined, where the channel estimate corresponding to the one time interval correspond to the IIR part of the filter and the reference symbols corresponding to the next time interval (i.e. received in the next time interval) correspond to the FIR part of the filter. Finally, this iterative filter computation is repeated over several periods to get the steady state solution for each filtering from time interval to the successive time interval within one period. These steady state filters are applied from the initial period on, and time filter coefficients corresponding to similar transitions are summarized, also for various reference symbol patterns with the same period. So, the total number of filter coefficients can be kept low although the impact on the minimum mean square error of the channel estimation is negligible.

The coefficients of the steady state filters may be determined in this way and then stored in the communication device (e.g. a mobile terminal such as a mobile phone). For the determination of the filter coefficients (i.e. filter weights) an expected statistic behavior of the channel and the noise are for example used.

The components of the communication device (e.g. the receiver, the first filter, the second filter and the processor) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit". For example, the first filter and the second filter may be implemented by the same circuit.

The communication device 300 for example carries out a method as illustrated in FIG. 4.

FIG. 4 shows a flow diagram 400 illustrating a method for processing received signals, for example carried out by a communication device.

In 401, the communication device receives a plurality of first reference signal values in a first subframe of a radio frame structure.

In 402, the communication device receives a plurality of second reference signal values in a second subframe of the radio frame structure, wherein the first subframe and the second subframe are separated by one or more subframes of the radio frame structure.

In 403, the communication device filters the plurality of first reference signal values received in the first subframe to generate a first channel estimate.

In 404, the communication device filters the plurality of second reference signal values received in the second subframe based on the first channel estimate to generate a second channel estimate.

In 405, the communication device processes received signals based on the second channel estimate.

Example 1 is a communication device as illustrated in FIG. 1.

In Example 2, the subject matter of Example 1 may optionally include the first filter and the second filter comprising infinite impulse response filters.

In Example 3, the subject matter of any one of Examples 1-2 may optionally include each subframe of the radio frame structure comprising two or more time slots.

In Example 4, the subject matter of Example 3 may optionally include each time slot being assigned for the transmission of a plurality of Orthogonal Frequency-Division Multiplexing symbols.

In Example 5, the subject matter of any one of Examples 1-4 may optionally include the plurality of first reference signal values comprising reference signal values transmitted in different time slots of the radio frame structure and the plurality of second reference signal values comprising reference signal values transmitted in different time slots of the radio frame structure.

In Example 6, the subject matter of any one of Examples 1-5 may optionally include the receiver being configured to receive the plurality of first reference signal values and the plurality of second reference signal values in a time division duplex communication.

In Example 7, the subject matter of any one of Examples 1-6 may optionally include the first subframe and the second subframe being separated by a reference signal transmission pause interval comprising one or more subframes during which a transmission of reference signal values to the communication device being paused.

In Example 8, the subject matter of Example 7 may optionally include the one or more subframes of the transmission pause interval being allocated for an uplink transmission by the communication device.

In Example 9, the subject matter of any one of Examples 7-8 may optionally include the receiver being configured to receive the plurality of first reference signal values and the plurality of second reference signal values via a first communication channel wherein the one or more subframes of the transmission pause interval are allocated for a communication based on a second communication channel.

In Example 10, the subject matter of any one of Examples 1-9 may optionally include each first reference signal value of the plurality of first reference signal values being contained in an Orthogonal Frequency-Division Multiplexing symbol and each second reference signal value of the plurality of second reference signal values being contained in an Orthogonal Frequency-Division Multiplexing symbol.

In Example 11, the subject matter of any one of Examples 1-9 may optionally include the plurality of first reference signal values and the plurality of second reference signal values being values of one or more reference signals for a communication channel and the first channel estimate and the second channel estimate being channel estimates for the communication channel.

In Example 12, the subject matter of any one of Examples 1-11 may optionally include the first subframe and the second subframe being separated by one or more subframes in which the communication device is prevented from receiving a reference signal for channel estimation of the communication channel.

In Example 13, the subject matter of any one of Examples 1-11 may optionally include the first subframe and the second subframe being of different frames of the radio frame structure or the first subframe and the second subframe being of the same frame of the radio frame structure.

In Example 14, the subject matter of any one of Examples 1-13 may optionally further include a controller configured to determine, based on a reference signal transmission pattern for transmitting the plurality of first reference signal values and the plurality of second reference signal values, wherein the reference signal transmission pattern is divided into time intervals, wherein each time interval is a reference signal transmission interval in which reference signal values are transmitted according to the reference signal transmission pattern or is a reference signal transmission pause interval in which reference signal values are prevented from being transmitted according to the reference signal transmission pattern; and based on a smallest sub-pattern of one or more reference signal transmission intervals and one or more reference signal transmission pause intervals that periodically repeats itself within the reference signal transmission pattern; filter coefficients assigned to the reference signal transmission interval of the sub-pattern in which the plurality of first reference signal values are transmitted; filter coefficients assigned to the reference signal transmission interval of the sub-pattern in which the plurality of second reference signal values are transmitted and to control the first filter to filter the plurality of first reference signal values based on the filter coefficients assigned to the reference signal transmission interval of the sub-pattern in which the plurality of first reference signal values are transmitted; and control the second filter to filter the plurality of second reference signal values based on the filter coefficients assigned to the reference signal transmission interval of the sub-pattern in which the plurality of second reference signal values are transmitted.

In Example 15, the subject matter of Example 14 may optionally include each reference signal transmission interval and each reference signal transmission pause interval comprising one or more slots or one or more subframes.

Example 16 is a method for processing received signals as illustrated in FIG. 4.

In Example 17, the subject matter of Example 16 may optionally further include, before receiving the plurality of first reference signal values and the plurality of second reference signal values, determining a reference signal transmission pattern for transmitting reference signal values, wherein the reference signal transmission pattern is divided into time intervals, wherein may optionally include each time interval is a reference signal transmission interval in which reference signal values are transmitted according to the reference signal transmission pattern or is a reference signal transmission pause interval in which reference signal values are prevented from being transmitted according to the reference signal transmission pattern; finding a smallest sub-pattern of one or more reference signal transmission intervals and one or more reference signal transmission pause intervals that periodically repeats itself within the reference signal transmission pattern; assigning a filter to each reference signal transmission interval of the sub-pattern, wherein each filter is configured to filter reference signals transmitted in the signal transmission interval to which the filter is assigned; determining filter weights for each filter assigned to any of the time intervals of the sub-pattern.

In Example 18, the subject matter of Example 17 may optionally further include storing the filter weights in a communication device.

In Example 19, the subject matter of any one of Examples 16-18 may optionally further include filtering the plurality of first reference signal values received in the first subframe and filtering the plurality of second reference signal values received in the second subframe using infinite impulse response filters.

In Example 20, the subject matter of any one of Examples 16-19 may optionally include each subframe of the radio frame structure comprising two or more time slots.

In Example 21, the subject matter of Example 20 may optionally include each time slot being assigned for the transmission of a plurality of Orthogonal Frequency-Division Multiplexing symbols.

In Example 22, the subject matter of any one of Examples 16-21 may optionally include the plurality of first reference signal values comprising reference signal values transmitted in different time slots of the radio frame structure and the plurality of second reference signal values comprising reference signal values transmitted in different time slots of the radio frame structure.

In Example 23, the subject matter of any one of Examples 16-22 may optionally include receiving the plurality of first reference signal values and the plurality of second reference signal values in a time division duplex communication.

In Example 24, the subject matter of any one of Examples 16-23 may optionally include the first subframe and the second subframe being separated by a reference signal transmission pause interval comprising one or more subframes during which a transmission of reference signal values to the communication device being paused.

In Example 25, the subject matter of Example 24 may optionally include the one or more subframes of the transmission pause interval being allocated for an uplink transmission.

In Example 26, the subject matter of any one of Examples 24-25 may optionally include receiving the plurality of first reference signal values and the plurality of second reference signal values via a first communication channel wherein the one or more subframes of the transmission pause interval are allocated for a communication based on a second communication channel.

In Example 27, the subject matter of any one of Examples 16-26 may optionally include each first reference signal value of the plurality of first reference signal values being contained in an Orthogonal Frequency-Division Multiplexing symbol and each second reference signal value of the plurality of second reference signal values being contained in an Orthogonal Frequency-Division Multiplexing symbol.

In Example 28, the subject matter of any one of Examples 16-27 may optionally include the plurality of first reference signal values and the plurality of second reference signal values being values of one or more reference signals for a communication channel and the first channel estimate and the second channel estimate being channel estimates for the communication channel.

In Example 29, the subject matter of any one of Examples 16-28 may optionally include the first subframe and the second subframe being separated by one or more subframes in which receiving a reference signal for channel estimation of the communication channel is prevented.

In Example 30, the subject matter of any one of Examples 16-29 may optionally include the first subframe and the second subframe being of different frames of the radio frame structure or the first subframe and the second subframe being of the same frame of the radio frame structure.

In Example 31, the subject matter of any one of Examples 16-30 may optionally further include determining, based on a reference signal transmission pattern for transmitting the plurality of first reference signal values and the plurality of second reference signal values, wherein the reference signal transmission pattern is divided into time intervals, wherein each time interval is a reference signal transmission interval in which reference signal values are transmitted according to the reference signal transmission pattern or is a reference signal transmission pause interval in which reference signal values are prevented from being transmitted according to the reference signal transmission pattern; and based on a smallest sub-pattern of one or more reference signal transmission intervals and one or more reference signal transmission pause intervals that periodically repeats itself within the reference signal transmission pattern; filter coefficients assigned to the reference signal transmission interval of the sub-pattern in which the plurality of first reference signal values are transmitted; filter coefficients assigned to the reference signal transmission interval of the sub-pattern in which the plurality of second reference signal values are transmitted and filtering the plurality of first reference signal values based on the filter coefficients assigned to the reference signal transmission interval of the sub-pattern in which the plurality of first reference signal values are transmitted; and filtering the plurality of second reference signal values based on the filter coefficients assigned to the reference signal transmission interval of the sub-pattern in which the plurality of second reference signal values are transmitted.

In Example 32, the subject matter of Example 31 may optionally include each reference signal transmission interval and each reference signal transmission pause interval comprising one or more slots or one or more subframes.

Example 33 is a computer readable medium having recorded instructions thereon which, when executed by a processor, make the processor perform a method for performing radio communication according to any one of Examples 16 to 32.

Example 34 is a communication device comprising a receiving means for receiving a plurality of first reference signal values in a first subframe of a radio frame structure and for receiving a plurality of second reference signal values in a second subframe of the radio frame structure, wherein the first subframe and the second subframe are separated by one or more subframes of the radio frame structure; a first filtering means for filtering the plurality of first reference signal values received in the first subframe to generate a first channel estimate; a second filtering means for filtering the plurality of second reference signal values received in the second subframe based on the first channel estimate to generate a second channel estimate; and a processing means for processing received signals based on the second channel estimate.

In Example 35, the subject matter of Example 34 may optionally include the first filtering means and the second filtering means comprising infinite impulse response filters.

In Example 36, the subject matter of any one of Examples 34-35 may optionally include each subframe of the radio frame structure comprising two or more time slots.

In Example 37, the subject matter of Example 36 may optionally include each time slot being assigned for the transmission of a plurality of Orthogonal Frequency-Division Multiplexingsymbols.

In Example 38, the subject matter of any one of Examples 34-37 may optionally include the plurality of first reference signal values comprising reference signal values transmitted in different time slots of the radio frame structure and the plurality of second reference signal values comprising reference signal values transmitted in different time slots of the radio frame structure.

In Example 39, the subject matter of any one of Examples 34-38 may optionally include the receiving means being for receiving the plurality of first reference signal values and the plurality of second reference signal values in a time division duplex communication.

In Example 40, the subject matter of any one of Examples 34-39 may optionally include the first subframe and the second subframe being separated by a reference signal transmission pause interval comprising one or more subframes during which a transmission of reference signal values to the communication device being paused.

In Example 41, the subject matter of Example 40 may optionally include the one or more subframes of the transmission pause interval are allocated for an uplink transmission by the communication device.

In Example 42, the subject matter of any one of Examples 40-41 may optionally include the receiving means being for receiving the plurality of first reference signal values and the plurality of second reference signal values via a first communication channel and the one or more subframes of the transmission pause interval being allocated for a communication based on a second communication channel.

In Example 43, the subject matter of any one of Examples 34-42 may optionally include each first reference signal value of the plurality of first reference signal values being contained in an Orthogonal Frequency-Division Multiplexing symbol and each second reference signal value of the plurality of second reference signal values being contained in an Orthogonal Frequency-Division Multiplexing symbol.

In Example 44, the subject matter of any one of Examples 34-43 may optionally include the plurality of first reference signal values and the plurality of second reference signal values being values of one or more reference signals for a communication channel and the first channel estimate and the second channel estimate being channel estimates for the communication channel.

In Example 45, the subject matter of any one of Examples 34-44 may optionally include the first subframe and the second subframe being separated by one or more subframes in which the communication device is prevented from receiving a reference signal for channel estimation of the communication channel.

In Example 46, the subject matter of any one of Examples 34-45 may optionally include the first subframe and the second subframe being of different frames of the radio frame structure or the first subframe and the second subframe being of the same frame of the radio frame structure.

In Example 47, the subject matter of any one of Examples 34-46 may optionally further include controlling means for determining, based on a reference signal transmission pattern for transmitting the plurality of first reference signal values and the plurality of second reference signal values, wherein the reference signal transmission pattern is divided into time intervals, wherein each time interval is a reference signal transmission interval in which reference signal values are transmitted according to the reference signal transmission pattern or is a reference signal transmission pause interval in which reference signal values are prevented from being transmitted according to the reference signal transmission pattern; and based on a smallest sub-pattern of one or more reference signal transmission intervals and one or more reference signal transmission pause intervals that periodically repeats itself within the reference signal transmission pattern; filter coefficients assigned to the reference signal transmission interval of the sub-pattern in which the plurality of first reference signal values are transmitted; filter coefficients assigned to the reference signal transmission interval of the sub-pattern in which the plurality of second reference signal values are transmitted and for controlling the first filtering means to filter the plurality of first reference signal values based on the filter coefficients assigned to the reference signal transmission interval of the sub-pattern in which the plurality of first reference signal values are transmitted; and controlling the second filtering means to filter the plurality of second reference signal values based on the filter coefficients assigned to the reference signal transmission interval of the sub-pattern in which the plurality of second reference signal values are transmitted.

In Example 48, the subject matter of Example 47 may optionally include each reference signal transmission interval and each reference signal transmission pause interval comprising one or more slots or one or more subframes.

It should be noted that one or more of the features of any of the examples above may be combined with any one of the other examples.

In the following, examples are described in more detail.

FIG. 5 illustrates FIR time filtering of reference symbols for FDD communication.

The reference symbols are transmitted in accordance with a frame structure 501 (in this example two frames #0 (i.e. the initial frame) and #1 are shown) as explained with reference to FIG. 2. Accordingly, each frame includes ten subframes (indicated as sf#0 to sf#9 within each frame) and each subframe includes a first slot (denoted as even slot) and followed by a second slot (denoted as odd slot). The filtering is illustrated in FIG. 5 for extended cyclic prefix mode, i.e., 12 OFDM symbols per subframe, wherein each OFDM symbol is represented as a column of 12 resource elements (represented by the small squares in FIG. 5).

The FIR time filtering illustrated in FIG. 5 uses, besides a starting filter 502 for the first (i.e. even) slot of subframe sf#0 which only processes the reference signals of the current slot, time filters 503 spanning three time slots, i.e., process reference signals received at a current time slot, the previous time slot and the next time slot.

Thus, the filters 503 process a sequence of six successively (e.g. frequency-filtered) reference symbols $y_0$, $y_1$, ..., and $y_5$ (each being transmitted using one resource element) according to the FIR operation $$\hat{h}_1 = w_0 y_0 + w_1 y_1 + w_2 y_2 + w_3 y_3 + w_4 y_4 + w_5 y_5,$$

where $w_0, w_1, \ldots,$ and $w_5$ denote the filter coefficients. They are determined according to a FIR MMSE approach, i.e., $$w_0, w_1, \ldots, w_5 = \operatorname{argmin} E[|h_i - w_0 y_0 + w_1 y_1 + w_2 y_2 + w_3 y_3 + w_4 y_4 + w_5 y_5|^2],$$

where the mean square error between the channel coefficient $h_i$ and the corresponding channel estimate $\hat{h}_i$ is minimized.

For this, the autocorrelation matrix $R_y$ of the frequency filtered reference symbols is computed as the sum of the autocorrelation matrix of the channel $R_h$ and of the noise $R_n$, as the channel portions $h_0, h_1, \ldots,$ and $h_5$ and the noise portions $n_0, n_1, \ldots,$ and $n_5$ are uncorrelated. The (i,j)-th element $(R_h)_{i,j}$ contains the autocorrelation function of the channel $E[h_i h_j]$ in time direction, and the (i,j)-th element $(R_n)_{i,j}$ contains the autocorrelation function of the noise $E[n_i n_j] = N_0$, i=j, and $E[n_i n_j] = 0$ otherwise. The autocorrelation matrices for channel and noise $$R_h = \begin{bmatrix} E[h_0 h_0] & \cdots & E[h_0 h_5] \\ \vdots & \ddots & \vdots \\ E[h_0 h_5] & \cdots & E[h_5 h_5] \end{bmatrix}$$

and $$R_n = \begin{bmatrix} E[n_0 n_0] & \cdots & E[n_0 n_5] \\ \vdots & \ddots & \vdots \\ E[n_5 n_0] & \cdots & E[n_5 n_5] \end{bmatrix} = N_0 \begin{bmatrix} 1 & \cdots & 0 \\ \vdots & \ddots & \vdots \\ 0 & \cdots & 1 \end{bmatrix}$$

yield the autocorrelation matrix $$R_y = R_h + R_n$$

Also, the cross correlation vector between frequency-filtered reference symbols $y_0$, $y_1$, and $y_5$ and the channel coefficient $h_i$ is determined, which equals the cross correlation vector of the channel in time direction with the elements $E[h_i h_j]$, i.e., $$r_{h_i} = \begin{bmatrix} E[h_i h_0] \\ \cdots \\ E[h_i h_5] \end{bmatrix}$$

Besides the frequency-filtered reference symbols corresponding to the current time slot $y_2$ and $y_3$, those of the previous time slot $y_0$ and $y_1$ and those of the next time slot $y_4$ and $y_5$ are also included. So, at low Doppler frequencies, an averaging over six frequency-filtered reference symbols is performed, where the signal energy is increased by a power of two, while the noise energy is only growing linearly. This gain of the output signal to noise ratio is limited by the number of frequency-filtered reference symbols which can be stored simultaneously in the receiver.

To achieve a high signal to noise ratio gain with a low number of frequency-filtered reference symbols, IIR time filtering as illustrated in FIG. 6 can be used.

FIG. 6 illustrates IIR time filtering for FDD communication including an iterative minimum mean square error filter computation with an IIR update taking place every time slot.

Similarly to FIG. 5, the reference symbols are transmitted in accordance with a frame structure 601, each frame including ten subframes and each subframe including a first slot followed by a second slot, and the filtering is illustrated for extended cyclic prefix mode, i.e., 12 OFDM symbols per subframe, wherein each OFDM symbol is represented as a column of 12 resource elements.

The IIR time filtering illustrated in FIG. 6 uses a starting filter 602 whose MMSE Filter output (referred to as IIR update) for the first slot of sf#0 of radio frame #0 is linearly combined and stored for filtering usage in subsequent slots. For each following slot, a filter 603 computes an IIR update h(i) based on the previous stored IIR update h(i−1) and on two frequency-filtered reference symbols of the current slot $y_0(i)$ and $y_1(i)$ in order to process channel estimates of the past slots according to the IIR operation $$\hat{h}(i) = h(i-1) w'(i) + w_0(i) y_0(i) + w_1(i) y_1(i),$$

where the filter coefficients w'(i) (IIR portion) and $w_0(i)$ and $w_1(i)$ (FIR portion) are determined according to an IIR MMSE approach, i.e., $$w''(i), w_0(i), w_1(i) = \operatorname{argmin} E[|h(i)-(h(i-1)w'(i)+w_0(i)y_0+w_1(i)y_1(i)|^2].$$

So, the channel estimate $h(i-1)$ and thereby the MMSE filter corresponding to all previous slots have an impact on the a current MMSE filter 603. For the filter computation, the autocorrelation matrix of the vector $[h(i-1), y_0(i), y_1(0)]^T$ is determined, where $h(i-1)=h(i-2)w'(i-1)+w_0(i-1)y_0(i-1)+w_1(i-1)y_1(i-1)$ describes the previous IIR update and for the starting filter 602 it reads $h(0)=w_0(0)y_0(0)+w_1(0)y_1(0)$. So, for the transition from slot #0, i.e. the first slot of sf#0 of the first radio frame to slot #1, i.e. the second slot of sf#0 of the first radio frame, the autocorrelation matrix $R_y$ of the frequency-filtered reference symbols $y_0(0)$, $y_1(0)$, $y_0(1)$, and $y_1(1)$ is the sum of the autocorrelation matrices of the channel coefficients $h_0(0)$, $h_1(0)$, $h_1(0)$, and $h_1(1)$ and of the noise components $n_0(0)$, $n_1(0)$, $n_1(0)$, and $n_1(1)$, i.e., $$R_h = \begin{bmatrix} E[h_0(0)h_0(0)] & \cdots & E[h_0(0)h_1(1)] \\ \vdots & \ddots & \vdots \\ E[h_1(1)h_0(0)] & \cdots & E[h_1(1)h_1(1)] \end{bmatrix}$$

and $$R_n = \begin{bmatrix} E[n_0(0)n_0(0)] & \cdots & E[n_0(0)n_1(1)] \\ \vdots & \ddots & \vdots \\ E[n_1(1)n_0(0)] & \cdots & E[n_1(1)n_1(1)] \end{bmatrix} = N_0 \begin{bmatrix} 1 & \cdots & 0 \\ \vdots & \ddots & \vdots \\ 0 & \cdots & 1 \end{bmatrix}$$

yield the autocorrelation matrix $$R_y = R_h + R_n.$$

It is multiplied with a prefilter matrix $$P_0 = \begin{bmatrix} p_0(0) & p_1(0) & 0 & 0 \\ 0 & 0 & 1 & 0 \\ 0 & 0 & 0 & 1 \end{bmatrix},$$

from the left and from the right hand side. It is defined by the MMSE filter coefficients $w_0(0)$ and $w_1(0)$ for slot #0 according to $$[\, p_0(0) \quad p_1(0)\, ] = [\, w_0(0) \quad w_1(0)\, ] \begin{bmatrix} 1 & 0 \\ 0 & 1 \end{bmatrix}$$

The prefilter matrix is also applied to the cross-correlation vector between $h_0(0)$, $h_1(0)$, $h_1(0)$, and $h_1(1)$ and $h(i)$. For the transition from slot #1 to slot #2 (i.e. the first slot of sf#1 of the first radio frame), the frequency-filtered reference symbols $y_0(0)$, $y_1(0)$, $y_1(1)$, $y_1(1)$, $y_0(2)$, and $y_1(2)$ and the autocorrelation matrices $$R_h = \begin{bmatrix} E[h_0(0)h_0(0)] & \cdots & E[h_0(0)h_1(2)] \\ \vdots & \ddots & \vdots \\ E[h_1(2)h_0(0)] & \cdots & E[h_1(2)h_1(2)] \end{bmatrix}$$

and $$R_n = \begin{bmatrix} E[n_0(0)n_0(0)] & \cdots & E[n_0(0)n_1(2)] \\ \vdots & \ddots & \vdots \\ E[n_1(2)n_0(0)] & \cdots & E[n_1(2)n_1(2)] \end{bmatrix} = N_0 \begin{bmatrix} 1 & \cdots & 0 \\ \vdots & \ddots & \vdots \\ 0 & \cdots & 1 \end{bmatrix}$$

are considered.

The prefilter matrix reads $$P_1 = \begin{bmatrix} p_0(1) & p_1(1) & p_2(1) & p_3(1) & 0 & 0 \\ 0 & 0 & 0 & 0 & 1 & 0 \\ 0 & 0 & 0 & 0 & 0 & 1 \end{bmatrix}$$

where the MMSE filter coefficients $w_0(0)$ and $w_1(0)$ for slot #0 and w'(1), $w_0(1)$, and $w_1(1)$ from slot #1 are used according to $$[\, p_0(1) \quad p_1(1) \quad p_2(1) \quad p_3(1)\, ] =$$
$$[\, w'(1) \quad w_0(1) \quad w_1(1)\, ] \begin{bmatrix} w_0(0) & w_1(0) & 0 & 0 \\ 0 & 0 & 1 & 0 \\ 0 & 0 & 0 & 1 \end{bmatrix}$$

So, for the n-th slot, a $3 \times 2(n+1)$ prefilter matrix converts the $2(n+1) \times 2(n+1)$ autocorrelation matrix $$R_y = R_h + R_n$$

into a $3 \times 3$ autocorrelation matrix $$R_z = P_n R_y P_n^H$$

and the $2(n+1)$ crosscorrelation vector into a $3 \times 1$ crosscorrelation vector $$r_z = P_n^H r_y,$$

respectively.

For each transition from one slot to the next, a time filter with three taps is typically sufficient although the autocorrelation properties of the channel and the noise for all n slots are processed. It is computed based on an inversion of a $3 \times 3$ matrix according to $$w_z = R_z^{-1} r_z.$$

For the remaining OFDM symbols except the IIR update, an interpolation filter based on the previous IIR update $h(i-1)$ and the frequency-filtered reference symbols of the current slot $y_0(i)$ and $y_1(i)$ is used. So, only one IIR update per slot is computed instead of applying and computing IIR updates for each OFDM symbol in a slot.

The iterative minimum mean square error filter computation yields a steady state solution for each OFDM symbol after several tens of frames. Once the steady-state filter coefficients are available, they can be directly applied from the initial slot on, as illustrated in FIG. 7, whereby the mean square error of the channel estimation is only increased marginally.

FIG. 7 illustrates IIR time filtering for FDD communication including an iterative minimum mean square error filter computation with an IIR update taking place every time slot.

Similarly to FIG. 5, the reference symbols are transmitted in accordance with a frame structure 701, each frame including ten subframes and each subframe including a first slot followed by a second slot, and the filtering is illustrated for extended cyclic prefix mode, i.e., 12 OFDM symbols per subframe, wherein each OFDM symbol is represented as a column of 12 resource elements.

As for FDD communication, the reference symbol pattern is the same for all subframes and for all slots, i.e., the reference symbol pattern is repeated periodically after one slot, the same steady state filter 702 may be used for all slots.

Figure 8B:
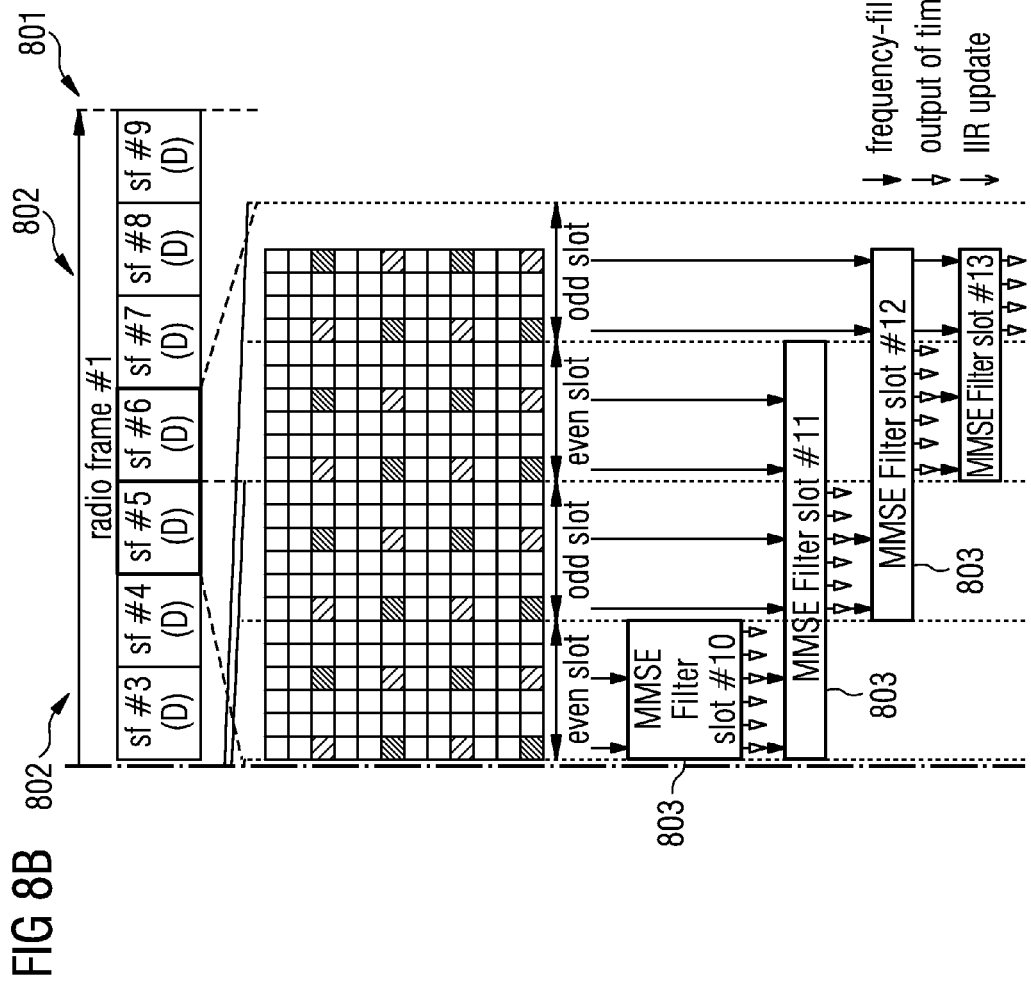

For a TDD communication, where several subframes of one radio frame can be uplink subframes, a FIR time filtering approach as illustrated in FIG. 8 may be used.

FIG. 8 illustrates FIR time filtering in a TDD communication, in this example for ul/dl configuration 0 and special sf configuration 3 according to 3GPP.

Similarly to FIG. 5, the reference symbols are transmitted in accordance with a frame structure 801, each frame including ten subframes and each subframe including a first slot followed by a second slot, and the filtering is illustrated for extended cyclic prefix mode, i.e., 12 OFDM symbols per subframe, wherein each OFDM symbol is represented as a column of 12 resource elements.

In case of TDD, the subframes in which reference symbols are transmitted are separated by gaps 802 in which the transmission of reference symbols is paused.

As explained with reference to FIG. 5, if available, a filter 803 uses the frequency-filtered reference symbols corresponding to a current time slot, the previous and the next time slot for the time filtering. At the edges of the gaps 802 a filter only uses two reference signals (similarly to the starting filter 502 in FIG. 5) or four reference signals. Accordingly, the gain of the signal to noise ratio is reduced compared to FIR filtering in an FDD communication as illustrated in FIG. 5.

Figure 9D:
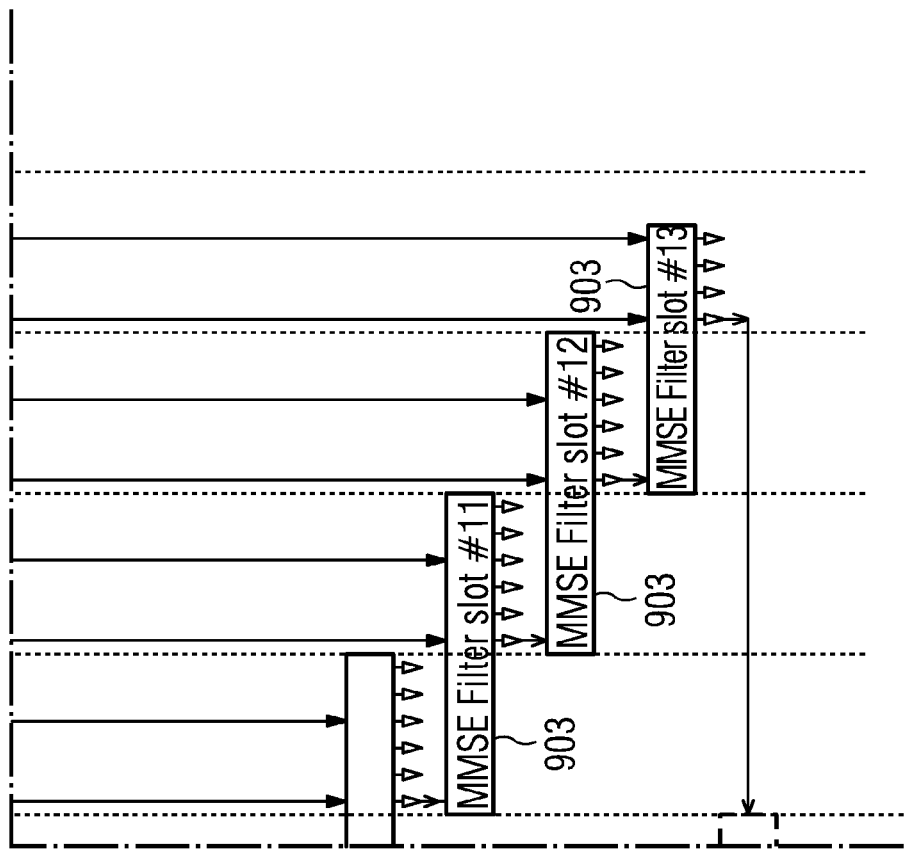

To achieve a high signal to noise ratio gain although the number of frequency-filtered reference symbols is lower compared to FDD communication, generalized IIR time filtering as shown in FIG. 9 can be used.

FIG. 9 illustrates IIR time filtering in a TDD communication, in this example for ul/dl configuration 0 and special sf configuration 3, including iterative minimum mean square error filter computation.

Similarly to FIG. 5, the reference symbols are transmitted in accordance with a frame structure 901, each frame including ten subframes and each subframe including a first slot followed by a second slot, and the filtering is illustrated for extended cyclic prefix mode, i.e., 12 OFDM symbols per subframe, wherein each OFDM symbol is represented as a column of 12 resource elements. As in FIG. 8, the subframes in which reference symbols are transmitted are separated by gaps 902 in which the transmission of reference symbols is paused.

As explained with reference to FIG. 6, for a current slot, each filter 903, 904 determines an IIR update based on the previous IIR update and on the frequency-filtered reference symbols of the current slot, wherein, in contrast to FIG. 6, a previous IIR update may be generated based on reference signals of a slot that is separated from the current slot by a gap 902 as illustrated by filters 904 which can be seen to span a gap 902.

For the remaining OFDM symbols, an interpolation filter based on the previous IIR update and the frequency-filtered reference symbols of the current slot is used. So, only one IIR update per slot is computed instead of applying and computing IIR updates for each OFDM symbol in a slot.

The iterative minimum mean square error filter computation yields a steady state solution for each OFDM symbol after several frames, where the filter coefficients are different for each of the transitions within one frame. Once the steady-state filter coefficients for each transition are available, they can be directly applied from the initial slot on, as shown in FIG. 10, whereby the mean square error of the channel estimation is only increased marginally.

Figure 10C:
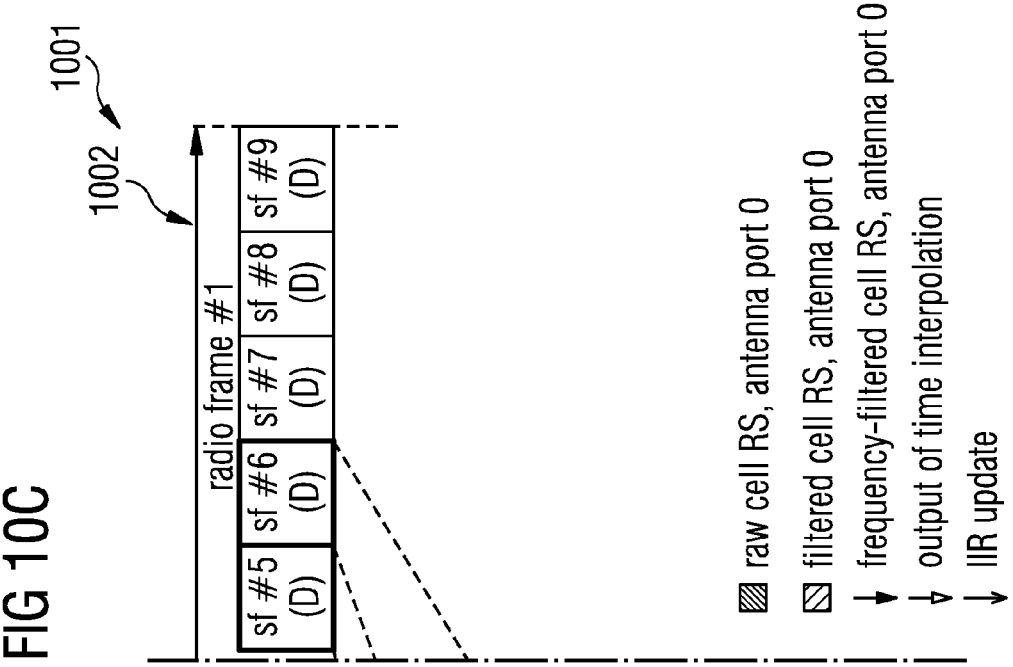

FIG. 10 illustrates IIR time filtering in a TDD communication, in this example for ul/dl configuration 0 and special sf configuration 3, with steady state filters.

Similarly to FIG. 5, the reference symbols are transmitted in accordance with a frame structure 1001, each frame including ten subframes and each subframe including a first slot followed by a second slot, and the filtering is illustrated for extended cyclic prefix mode, i.e., 12 OFDM symbols per subframe, wherein each OFDM symbol is represented as a column of 12 resource elements. As in FIG. 8, the subframes in which reference symbols are transmitted are separated by gaps 1002 in which the transmission of reference symbols is paused.

For the ul/dl configuration 0, the period after which the reference symbol pattern appears again is 10 slots (five sub frames), and the steady state filters for the filtering within slots #0 to #3 and slots #10 to #13 coincide. Accordingly, besides one starting filter 1003 for the first slot of the first radio frame four steady state filters 1004 may be used.

For the ul/dl configurations 1 and 2, combined with an arbitrary special sf configuration, the steady state filter computation is similar like for ul/dl configuration 0, as the reference symbol pattern is repeated periodically after 10 slots.

Figure 11B:
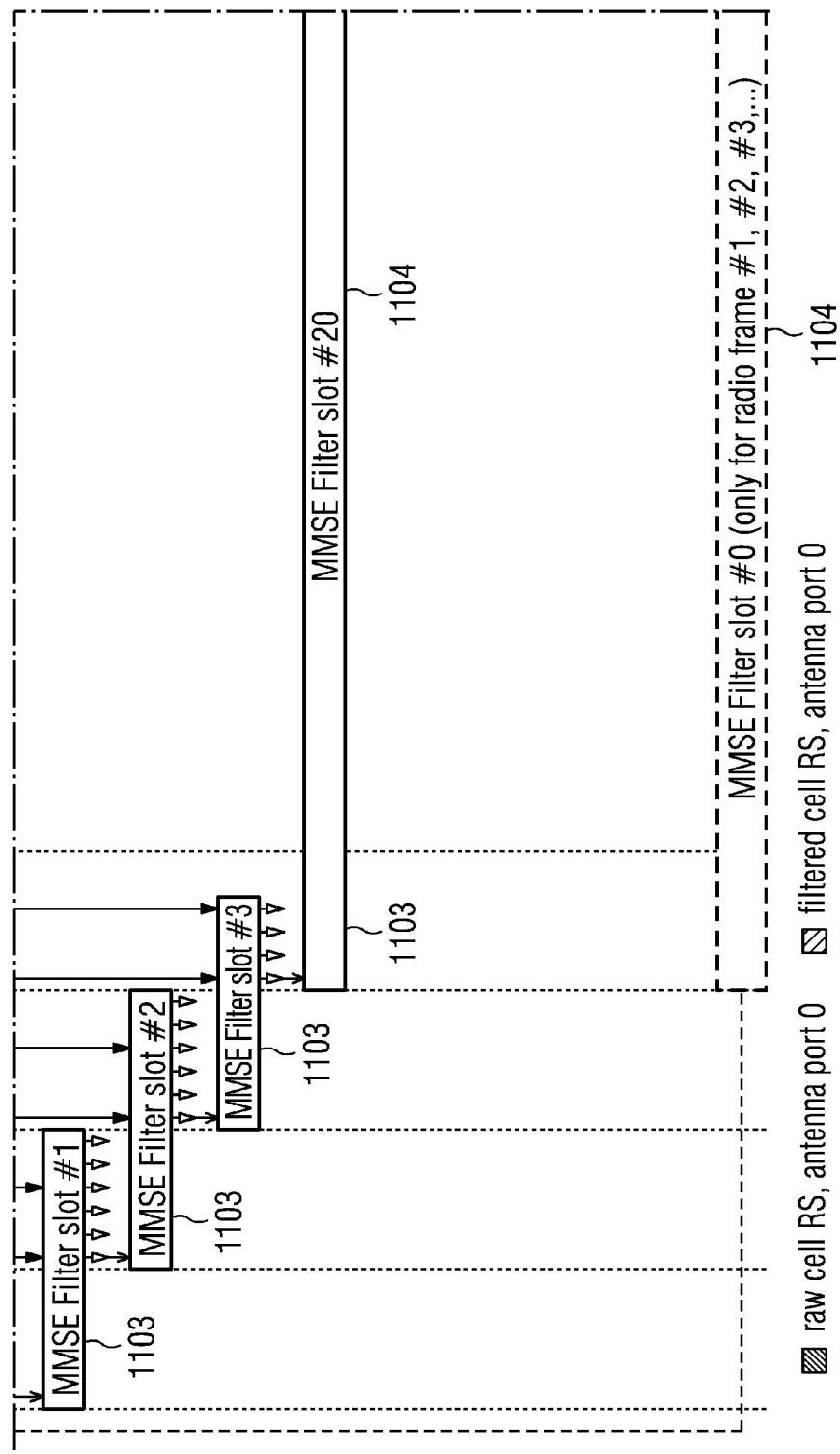

For ul/dl configurations 3, 4, 5, and 6 and any special sf configuration, as shown in FIG. 11, an increased number of steady state filters for IIR time filtering is used and different steady state filters within one frame cannot be summarized.

FIG. 11 illustrates IIR time filtering for a TDD communication including iterative minimum mean square error filter computation, in this example for ul/dl configuration 3, special sf configuration 3.

Similarly to FIG. 5, the reference symbols are transmitted in accordance with a frame structure 1101, each frame including ten subframes and each subframe including a first slot followed by a second slot, and the filtering is illustrated for extended cyclic prefix mode, i.e., 12 OFDM symbols per subframe, wherein each OFDM symbol is represented as a column of 12 resource elements. As in FIG. 8, the subframes in which reference symbols are transmitted are separated by gaps 1102 in which the transmission of reference symbols is paused.

As in the example of FIG. 9, each filter 1103, 1104 (except the one for sf#0 of the first radio frame) determines an IIR update based on the previous IIR update and on the frequency-filtered reference symbols of the current slot, wherein a previous IIR update may be generated based on reference signals of a slot that is separated from the current slot by a gap 1102 as illustrated by filters 1104 which can be seen to span a gap 1102.

Although for ul/dl configurations 0, 1, and 2, the number of different steady state filters can be reduced by one half by combining filters (e.g. as illustrated in FIG. 10), the number of different steady state coefficients is may still be too high, as 7 ul/dl configurations and up to 7 special subframe configurations for extended cyclic prefix and up to 9 special subframe configurations for normal cyclic prefix mode may for example need to be supported according to 3GPP. Thus, the following steady state filter coefficients which are almost identical are for example summarized, and only the following unique 13 steady state filters are used (instead of 49 or even 72 steady state filters for extended and normal cyclic prefix mode, respectively) and the corresponding filter coefficients stored (e.g. in a mobile terminal):

steady state filter FDD steady state filter TDD, UIDI (uplink/downlink) config 2/5, special SF config 3/4 for extended/normal cyclic prefix mode steady state filter TDD, UIDI config 2/5, special SF config 1,2,5,6/1,2,3,6,7,8 for extended/normal cyclic prefix mode steady state filter TDD, UIDI config 2/5, special SF config (0,4)/0,5 for extended/normal cyclic prefix mode steady state filter TDD, UIDI config 1/4/6, special SF config 3/4 for extended/normal cyclic prefix mode steady state filter TDD, UIDI config 1/4/6, special SF config 1,2,5,6/1,2,3,6,7,8 for extended/normal cyclic prefix mode steady state filter TDD, UIDI config 1/4/6, special SF config 0,4/0,5 for extended/normal cyclic prefix mode steady state filter TDD, UIDI config 0/3/6, special SF config 3/4 for extended/normal cyclic prefix mode steady state filter TDD, UIDI config 0/3/6, special SF config 1,2,5,6/1,2,3,6,7,8 for extended/normal cyclic prefix mode steady state filter TDD, UIDI config 0/3/6, special SF config 0,4/0,5 for extended/normal cyclic prefix mode steady state filter TDD, UIDI config 0/1/2/3/4/5/6, special SF config 1,2,5,6/1,2,3,6,7,8 for extended/normal cyclic prefix mode steady state filter TDD, UIDI config 0/1/2/3/4/5/6, special SF config 0,4/0,5 for extended/normal cyclic prefix mode first filter FDD In summary, the determination of IIR filters including the combination of IIR filters to reduce the number of filter coefficients to be stored in a communication device, e.g. a mobile phone, may for be carried out according to the following:

I. Find the smallest period after which the reference symbol pattern (i.e. reference signal transmission pattern) is repeated periodically.

II. Divide this period into time intervals with the same reference symbol structure (i.e. reference signal transmission sub-patterns), and define the transitions from time interval to time interval, including the filtering over gaps (including one or more subframes) which may or may not be present between the time intervals. A time interval is for example a time interval in which the reference signal values are received which are processed in one filtering operation (i.e. one channel estimate (i.e. IIR update) determination). Accordingly, the length of the time intervals is limited by the number of frequency-filtered reference symbols that can be processed and stored simultaneously.

III. Perform an iterative minimum mean square error approach from time interval to time interval, where one symbol constitutes the IIR update, and for the remaining OFDM symbols, a minimum mean square error interpolation is used. Repeat this computation over several periods, until the time filters converge to a steady state (typically already available after a few periods).

IV. To reduce the number of different filter coefficients, summarize steady states corresponding to identical time intervals. If possible, combine also filter coefficients corresponding to different reference symbol patterns with the same period.

V. Store the steady state filter coefficients and apply the steady state filter coefficients from the initial period on in the communication device. Only in the initial time intervals, the mean square error is increased slightly.

Thus, non-contiguous reference signal transmission structures corresponding to TDD, eMBMS, and navigation systems may be handled. Compared to FIR time filtering, the minimum mean square error of the channel estimation can be reduced, which translates into an improved receiver performance.

The above approach can be also applied to CSI-RS, PRS, and adapt test cases with periodic allocations for PDSCH, where the period for the reference symbol pattern is even larger than one frame. Also, it enables a combined optimization of time and frequency tracking and IIR filtering, as the update of time and frequency tracking is performed after several hundred subframes and special time filters are used. For the time and frequency tracking, a periodic coefficient loading dependent on the delay and Doppler spread estimation can also be included.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising
a receiver configured to receive a plurality of first reference signal values in a first subframe of a radio frame structure and to receive a plurality of second reference signal values in a second subframe of the radio frame structure, wherein the first subframe and the second subframe are separated by one or more subframes of the radio frame structure;
one or more filters configured to:
filter the plurality of first reference signal values received in the first subframe to generate a first channel estimate;
filter the plurality of second reference signal values received in the second subframe in combination with the first channel estimate to generate a second channel estimate;
a processor configured to process received signals based on the second channel estimate; and
a controller configured to:
determine, based on a smallest sub-pattern of one or more reference signal transmission intervals and one or more reference signal transmission pause intervals that periodically repeats itself within the reference signal transmission pattern,
a reference signal transmission pattern for transmitting the plurality of first reference signal values and the plurality of second reference signal values, wherein the reference signal transmission pattern is divided into time intervals, wherein each time interval is a reference signal transmission interval in which reference signal values are transmitted according to the reference signal transmission pattern or is a reference signal transmission pause interval in which reference signal values are prevented from being transmitted according to the reference signal transmission pattern; and
filter coefficients assigned to the reference signal transmission interval of the sub pattern in which the plurality of first reference signal values are transmitted.

2. The communication device of claim 1, wherein the first filter and the second filter comprise infinite impulse response filters.

3. The communication device of claim 1, wherein each subframe of the radio frame structure comprises two or more time slots.

4. The communication device of claim 3, wherein each time slot is assigned for the transmission of a plurality of Orthogonal Frequency-Division Multiplexing symbols.

5. The communication device of claim 1, wherein the plurality of first reference signal values comprise a plurality of reference signal values transmitted in different time slots of the radio frame structure and the plurality of second reference signal values comprise a plurality of reference signal values transmitted in different time slots of the radio frame structure.

6. The communication device of claim 1, wherein the receiver is configured to receive the plurality of first reference signal values and the plurality of second reference signal values in a time division duplex communication.

7. The communication device of claim 1, wherein the first subframe and the second subframe are separated by a reference signal transmission pause interval comprising one or more subframes during which a transmission of reference signal values to the communication device is paused.

8. The communication device of claim 7, wherein the one or more subframes of the transmission pause interval are allocated for an uplink transmission by the communication device.

9. The communication device of claim 7, wherein the receiver is configured to receive the plurality of first reference signal values and the plurality of second reference signal values via a first communication channel and the one or more subframes of the transmission pause interval are allocated for a communication based on a second communication channel.

10. The communication device of claim 1, wherein each first reference signal value of the plurality of first reference signal values is contained in an Orthogonal Frequency-Division Multiplexing symbol and each second reference signal value of the plurality of second reference signal values is contained in an Orthogonal Frequency-Division Multiplexing symbol.

11. The communication device of claim 1, wherein the plurality of first reference signal values and the plurality of second reference signal values are values of one or more reference signals for a communication channel and the first channel estimate and the second channel estimate are a plurality of channel estimates for the communication channel.

12. The communication device of claim 1, wherein the first subframe and the second subframe are separated by one or more subframes in which the communication device is prevented from receiving a reference signal for channel estimation of the communication channel.

13. The communication device of claim 1, wherein the first subframe and the second subframe are of different frames of the radio frame structure or the first subframe and the second subframe are of the same frame of the radio frame structure.

14. The communication device of claim 1, wherein the controller is further configured to:
filter coefficients assigned to the reference signal transmission interval of the sub-pattern in which the plurality of second reference signal values are transmitted and to control the first filter to filter the plurality of first reference signal values based on the filter coefficients assigned to the reference signal transmission interval of the sub-pattern in which the plurality of first reference signal values are transmitted; and
control the second filter to filter the plurality of second reference signal values based on the filter coefficients assigned to the reference signal transmission interval of the sub-pattern in which the plurality of second reference signal values are transmitted.

15. The communication device of claim 14, wherein each reference signal transmission interval and each reference signal transmission pause interval comprises one or more slots or one or more subframes.

16. A method for processing received signals comprising:
receiving a plurality of first reference signal values in a first subframe of a radio frame structure;
determining a reference signal transmission pattern for transmitting reference signal values, wherein the reference signal transmission pattern is divided into time intervals, wherein each time interval is a reference signal transmission interval in which reference signal values are transmitted according to the reference signal transmission pattern or where each time interval is a reference signal transmission pause interval in which reference signal values are prevented from being transmitted according to the reference signal transmission pattern;
finding a smallest sub-pattern of one or more reference signal transmission intervals and one or more reference signal transmission pause intervals that periodically repeats itself within the reference signal transmission pattern;
assigning a filter to each reference signal transmission interval of the sub-pattern, wherein each filter is configured to filter reference signals transmitted in the signal transmission interval to which the filter is assigned;
determining filter weights for each filter assigned to any of the time intervals of the sub-pattern;
receiving a plurality of second reference signal values in a second subframe of the radio frame structure, wherein the first subframe and the second subframe are separated by one or more subframes of the radio frame structure;
filtering the plurality of first reference signal values received in the first subframe to generate a first channel estimate;
filtering the plurality of second reference signal values received in the second subframe in combination with the first channel estimate to generate a second channel estimate; and
processing received signals based on the second channel estimate.

17. The method of claim 16, further comprising storing the filter weights in a communication device.

18. The method of claim 16, comprising filtering the plurality of first reference signal values received in the first subframe and filtering the plurality of second reference signal values received in the second subframe using infinite impulse response filters.

19. A non-transitory computer readable medium having recorded instructions thereon which, when executed by a processor, make the processor perform a method for performing radio communication according to claim 16.

* * * * *